United States Patent
Watanabe et al.

(10) Patent No.: US 10,848,315 B2
(45) Date of Patent: Nov. 24, 2020

(54) CONTRACT AGREEMENT METHOD, AGREEMENT VERIFICATION METHOD, CONTRACT AGREEMENT SYSTEM, AGREEMENT VERIFICATION DEVICE, CONTRACT AGREEMENT DEVICE, CONTRACT AGREEMENT PROGRAM AND AGREEMENT VERIFICATION PROGRAM

(71) Applicant: Nippon Telegraph and Telephone Corporation, Tokyo (JP)

(72) Inventors: Hiroki Watanabe, Yokosuka (JP); Akihito Akutsu, Yokosuka (JP); Yasuhiko Miyazaki, Yokosuka (JP); Atsushi Nakadaira, Yokosuka (JP); Shigeru Fujimura, Yokosuka (JP)

(73) Assignee: Nippon Telegraph and Telephone Corporation (JP)

( * ) Notice: Subject to any disclaimer, the term of this patent is extended or adjusted under 35 U.S.C. 154(b) by 293 days.

(21) Appl. No.: 15/743,523

(22) PCT Filed: Jul. 11, 2016

(86) PCT No.: PCT/JP2016/070415
§ 371 (c)(1),
(2) Date: Jan. 10, 2018

(87) PCT Pub. No.: WO2017/010455
PCT Pub. Date: Jan. 19, 2017

(65) Prior Publication Data
US 2018/0205555 A1    Jul. 19, 2018

(30) Foreign Application Priority Data

Jul. 13, 2015 (JP) ................. 2015-139490
Jul. 13, 2015 (JP) ................. 2015-139495

(51) Int. Cl.
H04L 9/32 (2006.01)
G06Q 10/06 (2012.01)
(Continued)

(52) U.S. Cl.
CPC ............ *H04L 9/3247* (2013.01); *G06F 21/64* (2013.01); *G06Q 10/06* (2013.01); *G06Q 20/38* (2013.01);
(Continued)

(58) Field of Classification Search
CPC ... H04L 9/3247; H04L 9/3239; H04L 9/3236; G06F 21/64
See application file for complete search history.

(56) References Cited

U.S. PATENT DOCUMENTS 10,158,480 B1 * 12/2018 Winklevoss .......... H04L 9/3239
10,340,038 B2 * 7/2019 Witchey ................ G06F 21/645
(Continued)

FOREIGN PATENT DOCUMENTS

| JP | 2002-49590 A | 2/2002 |
| JP | 2002-170058 A | 6/2002 |
| WO | 2001/52128 A1 | 7/2001 |

OTHER PUBLICATIONS

Blog, BlockSign.com, https://web.archive.org/web/20150305184700/https://blog.blocksign.com/, (Captured on) Mar. 5, 2015, (Year : 2015).*
(Continued)

*Primary Examiner* — Kari L Schmidt
(74) *Attorney, Agent, or Firm* — Kilpatrick Townsend & Stockton LLP

(57) ABSTRACT

Methods, systems, and devices for leaving evidence of a contract on a blockchain with a simple method while having agreements made among the involved parties, maintaining the mode of one electronic signature per transaction, and
(Continued)

maintaining credibility. Transactions of an issuing-party terminal, an agreeing-party terminal, and an agreeing-party terminal involved in contract agreement are linked as a chain, and the agreeing-party terminal at the end generates a transaction directed to the issuing-party terminal who has issued the contract. Each of these terminals previously generates a key pair for encryption of the contract and transmits the encryption key to a terminal which is its transaction sender. Then, this sender terminal encrypts a contract to be included in a transaction of the user of the sender terminal using the encryption key of the receiver of the transaction.

17 Claims, 15 Drawing Sheets

(51) Int. Cl.
  *G06Q 20/38* (2012.01)
  *G06F 21/64* (2013.01)
  *G06Q 20/40* (2012.01)

(52) U.S. Cl.
  CPC .......... *G06Q 20/40* (2013.01); *H04L 9/3226* (2013.01); *H04L 9/3236* (2013.01); *H04L 9/3239* (2013.01); *H04L 2209/38* (2013.01)

(56) References Cited

U.S. PATENT DOCUMENTS

| | | | |
|---|---|---|---|
| 10,484,168 B2* | 11/2019 | Ford | H04L 9/008 |
| 2002/0038424 A1 | 3/2002 | Joao et al. | |
| 2003/0177361 A1* | 9/2003 | Wheeler | H04L 63/0428 |
| | | | 713/176 |
| 2008/0209313 A1* | 8/2008 | Gonser | G06F 17/248 |
| | | | 715/255 |
| 2013/0019156 A1* | 1/2013 | Gonser | G06Q 50/18 |
| | | | 715/221 |
| 2014/0019761 A1* | 1/2014 | Shapiro | H04L 9/3247 |
| | | | 713/176 |
| 2015/0120567 A1 | 4/2015 | Van Rooyen et al. | |
| 2015/0206106 A1* | 7/2015 | Yago | G06F 21/645 |
| | | | 705/68 |
| 2015/0244690 A1* | 8/2015 | Mossbarger | H04L 63/061 |
| | | | 713/171 |
| 2015/0278820 A1* | 10/2015 | Meadows | G06Q 20/40145 |
| | | | 705/64 |
| 2015/0379510 A1* | 12/2015 | Smith | G06Q 20/3829 |
| | | | 705/71 |
| 2016/0204944 A1* | 7/2016 | Follis | G06F 21/64 |
| | | | 713/176 |
| 2016/0259937 A1* | 9/2016 | Ford | G06F 21/554 |
| 2016/0300223 A1* | 10/2016 | Grey | G06Q 20/3825 |
| 2016/0342980 A1* | 11/2016 | Thomas | G06Q 20/027 |
| 2017/0178127 A1* | 6/2017 | Kravitz | G06Q 20/38215 |
| 2018/0181768 A1* | 6/2018 | Leporini | G06F 21/31 |
| 2018/0343114 A1* | 11/2018 | Ben-Ari | H04L 9/0825 |
| 2019/0139136 A1* | 5/2019 | Molinari | G06F 21/645 |
| 2020/0051041 A1* | 2/2020 | Ko | H04L 9/3239 |
| 2020/0151712 A1* | 5/2020 | Felten | G06Q 20/389 |

OTHER PUBLICATIONS

E. Husni, B. Leksono and M. R. Rosa, "Digital signature for contract signing in service commerce," 2015 International Conference on Technology, Informatics, Management, Engineering & Environment (TIME-E), Samosir, 2015, pp. 111-116. (Year: 2015).*

N. R. Sunitha, B. B. Amberker and P. Koulgi, "Secure E-cheques for Joint Accounts with Collective Signing Using Forward-Secure Multi-signature Scheme," Seventh IEEE/ACIS International Conference on Computer and Information Science (icis 2008), Portland, OR, 2008, pp. 241-246. (Year: 2008).*

Xu, Lei, et al. "Enabling the sharing economy: Privacy respecting contract based on public blockchain." Proceedings of the ACM Workshop on Blockchain, Cryptocurrencies and Contracts. 2017, pp. 15-21. (Year: 2017).*

Supplementary European Search Report, European Patent Application No. 16824435.8, dated Feb. 4, 2019.

Swan, "Blockchain: Blueprint for a New Economy", Feb. 8, 2015, pp. 10, 37, 60.

International Preliminary Report on Patentability, PCT Application No. PCT/JP2016/070415, dated Jan. 25, 2018.

International Search Report, PCT Application No. PCT/JP2016/070415, dated Sep. 27, 2016.

Office Action, European Patent Application No. 16824435.8, dated Oct. 18, 2019, 5 pages.

International Search Report, PCT Application No. PCT/JP2016/057978, dated Jun. 14, 2016.

Saito, "Bitcoin: Digital Megalithic Currency Without Human Intervention", WIDE Technical-Report in 2013, WIDE Project, Dec. 31, 2013.

EC Kessai no Shin Model, Project Design, whole No. 31, Apr. 1, 2015, pp. 42-43.

Totake, "Bit Coin" wa Honto ni "Abunai" noka Kessai System to shite no "Kaso Tsuka" no Jitsuryoku, CardWave, Jun. 1, 2014, vol. 27, No. 3, pp. 20-25.

* cited by examiner

FIG. 2

TRANSACTION EXAMPLE

· HASH VALUE OF PREVIOUS TRANSACTION
  125AEADF27B0459B87···
· SIGNATURE VALUE OF SENDER (ELECTRONIC SIGNATURE OF SENDER)
  26DAFEE38FF2187402···
· HASH VALUE OF PUBLIC KEY OF SENDER (ADDRESS OF SENDER)
  MDQwDQYJKoZ···
· HASH VALUE OF PUBLIC KEY OF RECEIVER (ADDRESS OF RECEIVER)
  Ne1GrAgEAAiEAv···
· HASH VALUE OF CONTRACT 《ADDITIONAL》
  C8E0AB73702A57FAAEF···
· STATUS OF AGREEMENT 《ADDITIONAL》
  false

FIG. 9

TRANSACTION EXAMPLE

- HASH VALUE OF PREVIOUS TRANSACTION
  125AEADF27B0459B87···
- SIGNATURE VALUE OF SENDER (ELECTRONIC SIGNATURE OF SENDER)
  26DAFEE38FF2187402···
- PUBLIC KEY OF SENDER
- ADDRESS OF SENDER
  MDQwDQYJKoZ···
- ADDRESS OF RECEIVER
  Ne1GrAgEAAiEAv···
- HASH VALUE OF CONTRACT 《ADDITIONAL》
  C8E0AB73702A57FAAEF···
- STATUS OF AGREEMENT 《ADDITIONAL》
  false

FIG. 11

TRANSACTION EXAMPLE

- HASH VALUE OF PREVIOUS TRANSACTION
  125AEADF27B0459B87···
- SIGNATURE VALUE OF SENDER (ELECTRONIC SIGNATURE OF SENDER)
  26DAFEE38FF2187402···
- HASH VALUE OF PUBLIC KEY OF SENDER (ADDRESS OF SENDER)
  MDQwDQYJKoZ···
- HASH VALUE OF PUBLIC KEY OF RECEIVER (ADDRESS OF RECEIVER)
  Ne1GrAgEAAiEAv···
- ENCRYPTED CONTRACT DOCUMENT 《ADDITIONAL》
  5924GHHJ456378RDEFFF···
- STATUS OF AGREEMENT 《ADDITIONAL》
  false

FIG. 15

TRANSACTION EXAMPLE

- HASH VALUE OF PREVIOUS TRANSACTION
  125AEADF27B0459B87···
- SIGNATURE VALUE OF SENDER (ELECTRONIC SIGNATURE OF SENDER)
  26DAFEE38FF2187402···
- PUBLIC KEY OF SENDER
- ADDRESS OF SENDER
  MDQwDQYJKoZ···
- ADDRESS OF RECEIVER
  Ne1GrAgEAAiEAv···
- ENCRYPTED CONTRACT DOCUMENT 《ADDITIONAL》
  5924GHHJ456378RDEFFF···
- STATUS OF AGREEMENT 《ADDITIONAL》
  false

CONTRACT AGREEMENT METHOD, AGREEMENT VERIFICATION METHOD, CONTRACT AGREEMENT SYSTEM, AGREEMENT VERIFICATION DEVICE, CONTRACT AGREEMENT DEVICE, CONTRACT AGREEMENT PROGRAM AND AGREEMENT VERIFICATION PROGRAM

TECHNICAL FIELD

The present invention relates to a contract agreement method using the mechanism of blockchain. The present invention relates particularly to a technique for leaving evidence of a contract agreed on between involved parties.

BACKGROUND ART

An electronic signature is one of techniques for guaranteeing the source of information. Presently, the most widespread mechanism for implementing electronic signatures is based on public-key encryption. In this regard, a reliable third-party body is usually used to certify that an electronic key used for electronically-signed information really belongs to the source of the information. Credibility is assured when a reliable third-party body performs centralized management to link an individual with information on the key used by the individual.

Meanwhile, a mechanism that can assure credibility without needing such centralized management is starting to be widespread mainly for digital virtual currency. This mechanism is called blockchain and maintains soundness by assuring credibility of exchanged information using an agreement formation process in a network formed by all the participants and by preventing fraud, such as falsification and double spending, in the entire system (Non-patent document 1).

PRIOR ART DOCUMENT

Non-Patent Document

Non-patent document 1: Saito, "Bitcoin: Digital Megalithic Currency Without Human Intervention", WIDE Technical-Report in 2013, WIDE Project, Dec. 31, 2013

SUMMARY OF THE INVENTION

Problem to be Solved by the Invention

A blockchain functions as one gigantic ledger in which information on a transfer of virtual currency between participants is handled as a transaction in a unit called a block, and is shared by all the participants over a P2P (Peer to Peer) network. For example, a transaction such as "Mr. A gave three coins to Ms. B" is shared among all the participants. Seen as a ledger recording transactions of all the participants, blockchains can be applied to various transactions besides currency.

Thus, the present invention uses a blockchain as evidence of a contract made among a plurality of parties. A contract here refers to a sales contract, a deed of transfer, an application, a consent agreement, or the like, and is a document describing the content of a contract made among two or more individuals or bodies. In this regard, leaving evidence of how agreement formation has been done among two or more parties allows use of the evidence as an official proof in right claiming.

In a case of virtual currency described earlier, one transaction contains, for example, the hash value of a previous transaction, the address of a remitter, the address of a remittee, the amount paid, and an electronic signature of the remitter, which allow all the participants sharing the blockchain to check the content of the transaction officially. Thus, if information on a contract is added to a transaction in order to apply this transaction as evidence of contract agreement, similar effects are expected. Note that the addresses mentioned above each refer to, for example, the hash value of a public key for an electronic signature in the blockchain technique.

However, when a blockchain as used for virtual currency is applied for evidence of contract agreement, problems to be addressed include how to prove that the contract has been agreed on among two or more parties. The electronic-signature technique used in blockchains for virtual currency is built only on the electronic signature of a remitter as described above and does not require an electronic signature of a remittee. In contract making among two or more parties, on the other hand, a contract cannot be concluded by unilateral issuance of the contract, but must be agreed on by all the parties who are involved in the contract. However, each transaction forming a blockchain contains only the electronic signature of the sender, and the evidence of contract agreement by the receiver is not left in the transaction.

A simple, possible way to solve this problem is to, for example, include the electronic signatures of all the involved parties in one transaction. Virtual currency employs a mechanism called multisignature, which can create an address requiring a certain number of electronic signatures or more to approve a transaction. However, the procedure for including a plurality of electronic signatures in one transaction is complicated since there are decisions to make, such as which electronic signatures are needed in advance, how a pre-approved transaction is shared by the involved parties, and where to collect a plurality of secret keys for signing.

Adding information on a contract to a transaction poses another problem where the content of the contract can be read by a third party. This is because the content of a contract included in the transaction is opened to the public and easily read by a party other than the involved ones.

A simple, possible way to solve the second problem is to, for example, encrypt the content of a contract with a common key. However, the more the involved parties, the higher the risk of key leakage caused by the exchange of the common key. Thus, it is not easy to build a mechanism in which contract information held on a blockchain is made readable only by the involved parties under high security.

The present invention has been made in view of the above circumstances, and has a first objective to leave the evidence of a contract on a blockchain with a simple method while having agreements made among the involved parties and maintaining the mode of one electronic signature per transaction. Further, the present invention has a second objective to leave the evidence of a contract on a blockchain with a simple method while having agreements made among the involved parties, maintaining the mode of one electronic signature per transaction, and maintaining credibility.

Means for Solving the Problem

To solve the described-above problems, a first feature of the present invention is summarized as a contract agreement method performed among a plurality of apparatuses connected to a distributed network over which a blockchain is shared, the method including, by each of the plurality of apparatuses: storing in a storage unit a blockchain which is a chain of transactions links as blocks, the transactions each indicating evidence of agreement on a contract to be agreed on; when a transaction of a previous user last-linked to the blockchain is directed to the apparatus, comparing an identifier of a contract included in the transaction with an identifier of the contract to be agreed on; when the identifier of the contract included in the transaction matches the identifier of the contract to be agreed on, generating a transaction directed to a different apparatus and broadcasting the generated transaction to the network, the generated transaction including at least a proof of agreement or disagreement on the contract by a user of the apparatus, an electronic signature of the user of the apparatus, and the identifier of the contract to be agreed on; and updating the blockchain in the storage unit with a blockchain in which the generated transaction is linked to the transaction of the previous user, in which the plurality of apparatuses link transactions of their respective users involved in making the contract, and the last apparatus to perform the linking generates a transaction directed to the apparatus of an issuing party who has issued the contract.

A second feature of the present invention according to the first feature is summarized as the method further including, by each of the plurality of apparatuses: generating an encryption key and a decryption key for the contract; when a transaction of a previous user last-linked to the blockchain is directed to the apparatus, decrypting a contract included in the transaction with the decryption key of the apparatus; and when the decrypted contract and the contract to be agreed on match each other, encrypting the contract to be agreed on using an encryption key of a different apparatus, in which the broadcasting includes generating a transaction directed to the different apparatus and broadcasting the generated transaction to the network, the transaction including at least a proof of agreement or disagreement by a user of the apparatus on the contract, an electronic signature of the user of the apparatus, and the encrypted contract.

A third feature of the present invention according to the second feature is summarized as the contract agreement method, in which based on whether the contract decrypted with the decryption key of the apparatus matches the contract to be agreed on, the apparatus of the issuing party checks identity of the contract to be concluded.

A fourth feature of the present invention according to any one of the first to third features is summarized as the contract agreement method, in which the apparatus of the issuing party generates a transaction directed to a third party as a proof of attainment of evidence of agreement on the contract.

A fifth feature of the present invention according to any one of the first to fourth features is summarized as the contract agreement method, in which the network is a P2P (Peer to Peer) network.

A sixth feature of the present invention is summarized as a contract agreement verification method performed by an agreement verification apparatus to verify contract agreement performed by the contract agreement method according to any one of the first to fifth features, the method including, by the agreement verification apparatus: determining whether there is evidence of contract agreement based on whether a public key for an electronic signature included in a transaction at a start of the chain matches a public key for an electronic signature of a user of the apparatus that has received a transaction at an end of the chain.

A seventh feature of the present invention is summarized as a contract agreement system including a plurality of apparatuses connected to a distributed network over which a blockchain is shared, in which the plurality of apparatuses each includes: a storage unit that stores a blockchain which is a chain of transactions links as blocks, the transactions each indicating evidence of agreement on a contract to be agreed on; a matching unit that, when a transaction of a previous user last-linked to the blockchain is directed to the apparatus, compares an identifier of a contract included in the transaction with an identifier of the contract to be agreed on; a generation unit that, when the identifier of the contract included in the transaction matches the identifier of the contract to be agreed on, generates a transaction directed to a different apparatus and broadcasts the generated transaction to the network, the generated transaction including at least a proof of agreement or disagreement by a user of the apparatus on the contract, an electronic signature of the user of the apparatus, and the identifier of the contract to be agreed on; and a control unit that updates the blockchain in the storage unit with a blockchain in which the generated transaction is linked to the transaction of the previous user, and the plurality of apparatuses link transactions of their respective users involved in making the contract, and the last apparatus to perform the linking generates a transaction directed to the apparatus of an issuing party who has issued the contract.

A eighth feature of the present invention according to the seventh feature is summarized as the contract agreement system, in which each of the apparatuses further includes a generation unit that generates an encryption key and a decryption key for the contract; a decryption unit that, when a transaction of a previous user last-linked to the blockchain is directed to the apparatus, decrypts a contract included in the transaction with the decryption key of the apparatus; and an encryption unit that, when the decrypted contract matches the contract to be agreed on, encrypts the contract to be agreed on using an encryption key of a different apparatus, and the broadcasting generation unit includes generating a transaction directed to the different apparatus and broadcasting the generated transaction to the network, the transaction including at least a proof of agreement or disagreement by a user of the apparatus on the contract, an electronic signature of the user of the apparatus, and the encrypted contract.

A ninth feature of the present invention according to the eighth feature is summarized as the contract agreement system, in which the apparatus of the issuing party checks identity of the contract to be concluded, based on whether the contract decrypted with the decryption key of the apparatus matches the contract to be agreed on.

A tenth feature of the present invention according to any one of the seventh to ninth features is summarized as the contract agreement system, in which the apparatus of the issuing party generates a transaction directed to a third party as a proof of attainment of evidence of agreement on the contract.

A eleventh feature of the present invention according to any one of the seventh to tenth features is summarized as the contract agreement system, in which the network is a P2P (Peer to Peer) network.

A twelfth feature of the present invention is summarized as the agreement verification apparatus that verifies contract agreement performed by the contract agreement system according to any one of the seventh to eleventh features, the apparatus including: a verification unit that determines whether there is evidence of contract agreement based on whether a public key for an electronic signature included in a transaction at a start of the chain matches a public key for an electronic signature of a user of the apparatus that has received a transaction at an end of the chain.

A thirteenth feature of the present invention is summarized as a contract agreement apparatus connected to a distributed network over which a blockchain is shared, including: a storage unit that stores a blockchain which is a chain of transactions links as blocks, the transactions each indicating evidence of agreement on a contract to be agreed on; a matching unit that, when a transaction of a previous user last-linked to the blockchain is directed to the apparatus, compares an identifier of a contract included in the transaction with an identifier of the contract to be agreed on; a generation unit that, when the identifier of the contract included in the transaction matches the identifier of the contract to be agreed on, generates a transaction directed to a different apparatus and broadcasts the generated transaction to the network, the generated transaction including at least a proof of agreement or disagreement by a user of the apparatus on the contract, an electronic signature of the user of the apparatus, and the identifier of the contract to be agreed on; and a control unit that updates the blockchain in the storage unit with a blockchain in which the generated transaction is linked to the transaction of the previous user.

A fourteenth feature of the present invention according to the thirteenth feature is summarized as the contract agreement apparatus, further including: a generation unit that generates an encryption key and a decryption key for the contract; a decryption unit that, when a transaction of a previous user last-linked to the blockchain is directed to the apparatus, decrypts a contract included in the transaction with the decryption key of the apparatus; and an encryption unit that, when the decrypted contract matches the contract to be agreed on, encrypts the contract to be agreed on using an encryption key of a different apparatus, in which the broadcasting generation unit includes generating a transaction directed to the different apparatus and broadcasting the generated transaction to the network, the transaction including at least a proof of agreement or disagreement by a user of the apparatus on the contract, an electronic signature of the user of the apparatus, and the encrypted contract.

A fifteenth feature of the present invention is summarized as the agreement verification apparatus that verifies contract agreement performed by the contract agreement apparatus according to the thirteenth or fourteenth feature, including: a verification unit that determines whether there is evidence of contract agreement based on whether a public key for an electronic signature included in a transaction at a start of the chain matches a public key for an electronic signature of a user of the apparatus that has received a transaction at an end of the chain.

A sixteenth feature of the present invention is summarized as a contract agreement program that causes a computer to perform the contract agreement method according to any one of the first to fifth features.

A seventeenth feature of the present invention is summarized as an agreement verification program that causes a computer to perform the agreement verification method according to the sixth feature.

Effect of the Invention

The present invention can leave the evidence of a contract on a blockchain with a simple method while having agreements made among the involved parties and maintaining the mode of one electronic signature per transaction. The present invention can also leave the evidence of a contract on a blockchain with a simple method while having agreements made among the involved parties, maintaining the mode of one electronic signature per transaction, and maintaining credibility.

BRIEF DESCRIPTION OF THE DRAWINGS

FIG. 2 is a diagram illustrating an example of a transaction according to the first embodiment.

FIGS. 6(a), 6(b), and 6(c), collectively

FIG. 9 is a diagram illustrating another example of a transaction according to the first embodiment.

FIG. 11 is a diagram illustrating an example of a transaction according to the second embodiment.

FIG. 15 is another example of a transaction according to the second embodiment.

MODE FOR CARRYING OUT THE INVENTION

First Embodiment

The present invention uses existing blockchain technology to leave evidence of contract agreement. Specifically, the receiver of a transaction on an issued contract generates a transaction including its agreement on the contract and links the generated transaction to the contract transaction. Then, after all the involved parties link their transactions, the last transaction is returned to the contract-issuing party to close the chain of transactions. Further, the contract issuing party generates a transaction directed to a third party so that the uninvolved party can prove and guarantee that the contract has been agreed on by all the involved parties. In this way, evidence of contract agreement can be left with the conventional mode of one electronic signature per transaction maintained.

A mode for carrying out the present invention is described below using the drawings.

First, the overall configuration of a contract agreement system 100 is described with reference to FIG. 1. The present embodiment assumes that a total of three parties are involved in a contract. Further, a party trying to conclude a contract and leave evidence of contract agreement is called a contract issuing party, and a recipient of such a request is called a contract agreeing party. Moreover, an intervening party is assigned as a party to guarantee contract agreement made by all the involved parties. The intervening party corresponds to the third party described earlier. The intervening party is preferably a party not directly involved in the contract, such as a service provider of the contract agreement system or a contract agreement guarantee organization, but may be selected from the agreeing parties.

Figure 1:
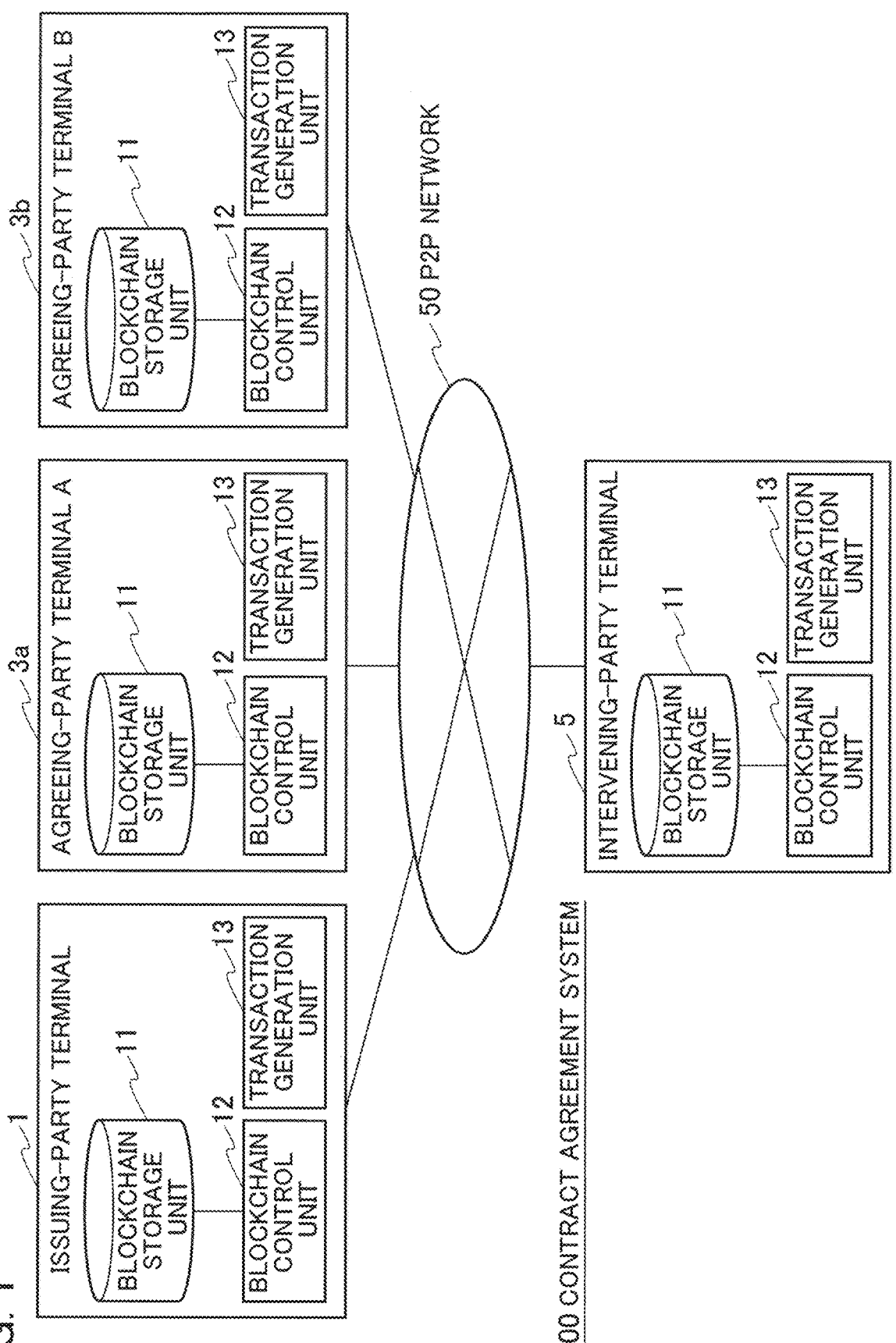
FIG. 1 is a diagram illustrating the overall configuration of a contract agreement system according to a first embodiment.

As illustrated in FIG. 1, the contract agreement system 100 is configured including an issuing-party terminal 1 used by a contract issuing party, two agreeing-party terminals 3a, 3b used respectively by two agreeing parties, and an intervening-party terminal 5 used by an intervening party. All these terminals are connected in an autonomous decentralized manner over a P2P network 50 over which blockchains are shared.

Each terminal includes common functional units, namely, a blockchain storage unit 11, a blockchain control unit 12, and a transaction generation unit 13. Other functional units will be described later.

The blockchain storage unit 11 has a function to store a blockchain. A blockchain is a chain of transactions where transactions each showing evidence of agreement on a contract to be agreed on are linked together as blocks.

The blockchain control unit 12 has a function to keep the up-to-date blockchain retained in the blockchain storage unit 11 up to date by cooperating with the blockchain control units of the other terminals in an autonomous decentralized manner. The blockchain control unit 12 also has a function to acquire the blockchain from the blockchain storage unit 11 and provide it to the transaction generation unit 13.

The transaction generation unit 13 has a function to, after confirmation of the authentication of a transaction of a previous user for example, generate a transaction of the user of the host terminal and broadcast the generated transaction to the P2P network 50.

A detailed description is now given of a transaction. In a case of conventional virtual currency, one transaction contains, as described earlier, the hash value of a previous transaction, the address of a sender, the address of a receiver, the amount paid, and an electronic signature of the sender. In the present embodiment, on the other hand, the hash value of a contract and a status of agreement are added to the conventional transaction as shown in FIG. 2, to identify a contract to be agreed on and to record agreement by an involved party on the contract. In other words, a transaction used in the present embodiment additionally includes information on a contract to be agreed on and information on agreement by an involved party on the contract to be agreed on, and the transaction is regarded as contract agreement proof data electronically signed by the sender. Thus, whether the involved parties have agreed on the contract can be recorded with the conventional mode of one electronic signature per transaction maintained.

The above are the functions of the terminals constituting the contract agreement system 100. Although not shown in FIG. 1, as in the case of virtual currency, an approval terminal that performs linkage for a blockchain through transaction approval work is present on the P2P network 50 to maintain the system of the blockchain.

Figure 3:
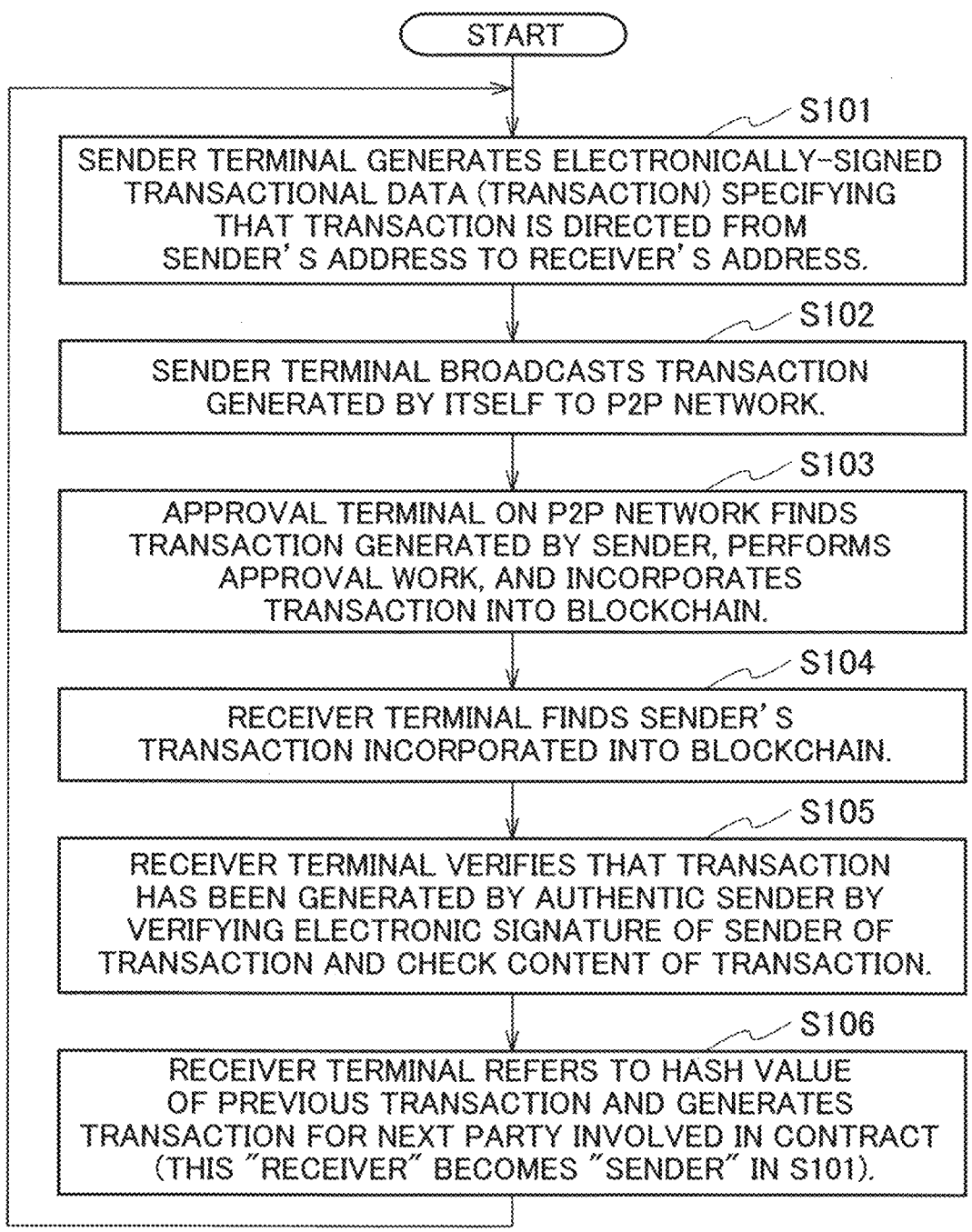
FIG. 3 is a diagram illustrating an operation of forming a blockchain.

Next, a description is given of how the contract agreement system 100 operates. Before that, how a blockchain is conventionally formed is described with reference to FIG. 3. FIG. 3 illustrates an operation in which a sender generates a transaction, blockchain approval work is performed on the transaction, and the receiver confirms the transaction. This operation is performed not only in the present embodiment, but also in virtual currency transfers using blockchains.

First, a sender terminal generates an electronically-signed transaction specifying that the transaction is directed from the address of the sender to the address of the receiver (Step S101), and broadcasts the transaction to the P2P network (Step S102).

Next, an approval terminal on the P2P network collects the transaction broadcasted to the network and performs approval work on the transaction bundled in a block (Step S103). Examples of methods proposed for this approval work in virtual currency include a method called Proof of Work which conducts complicated hash computation and a method called Proof of Stake which spends coin age. The present embodiment does not use such methods, but performs approval work and incorporates a transaction into a blockchain, or in other words, links a collected transaction to a previous transaction. The transaction thus linked is synchronized by all the terminals.

Figure 4:
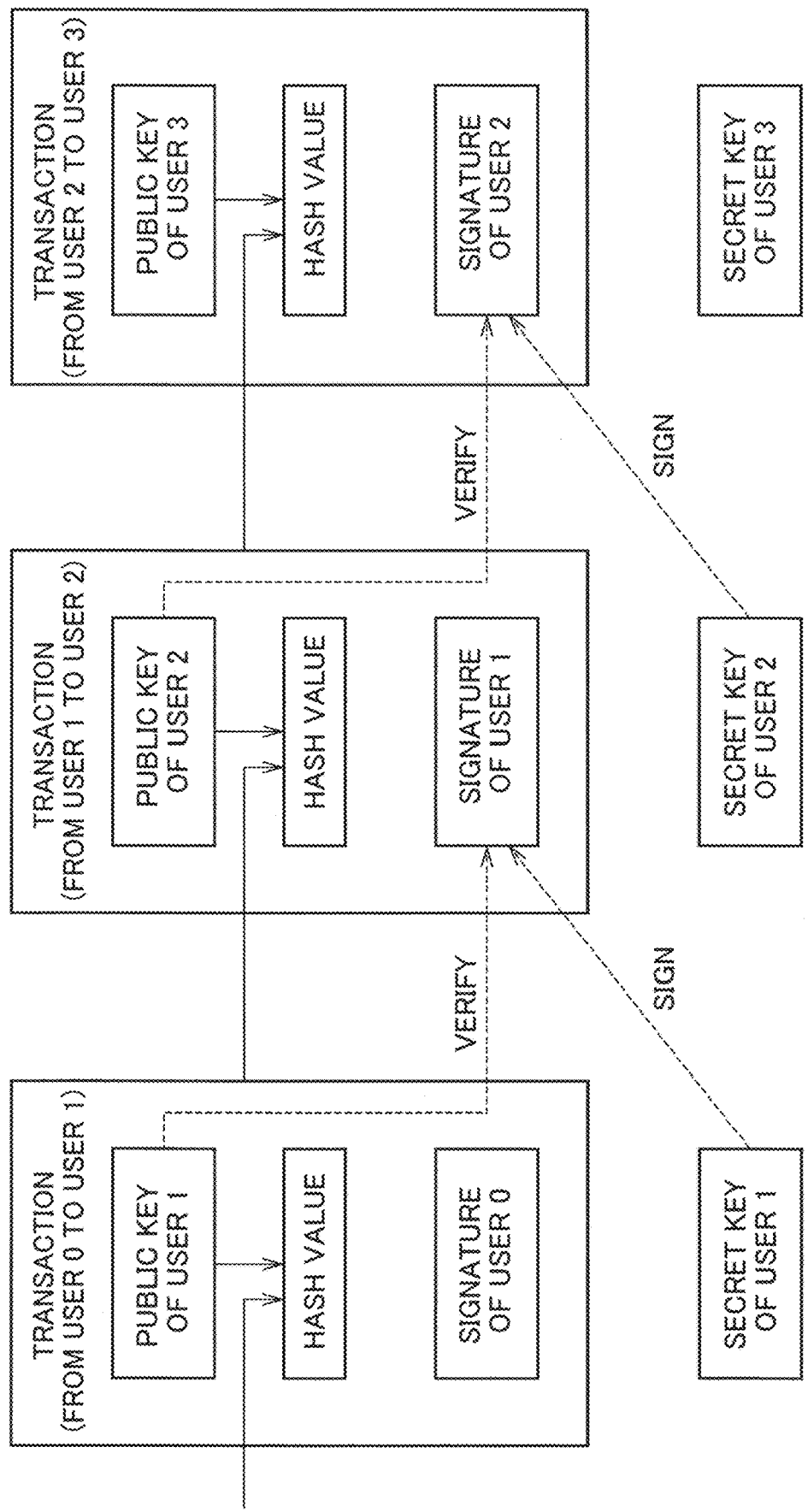
FIG. 4 is a diagram illustrating the image of a block chain.

Next, when finding the transaction incorporated in the blockchain (Step S104), a receiver terminal verifies if the previous transaction has been delivered from an authentic sender by, for example, as shown in FIG. 4, verifying the electronic signature on the found transaction using a public key of the sender and checking hash values against each other (Step S105). This verification method is implementable using a publicly known technique, and is described for example in Non-patent document 1.

After confirming the authenticity of the sender of the transaction, the receiver terminal refers to the transaction and generates a transaction directed to the next party (Step S106). This "receiver" then becomes the "sender" in Step S101.

A chain of transactions is formed when the above steps are repeated by a plurality of terminals. The present embodiment uses this chain of transactions to leave evidence of contract agreement.

Figure 5:
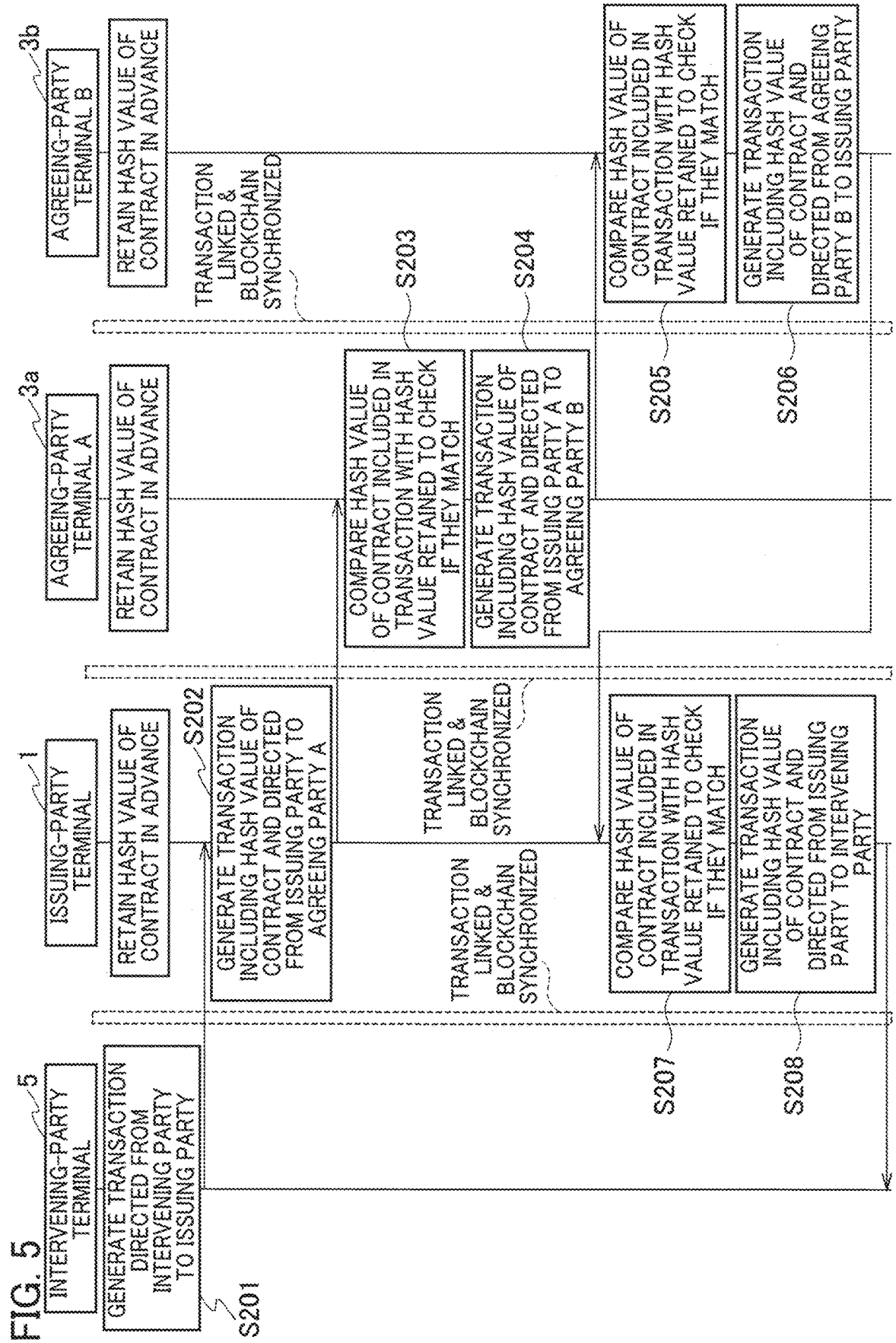
FIG. 5 is a diagram illustrating the overall operation performed by the contract agreement system according to the first embodiment.

Next, with reference to FIG. 5, a description is given of how the contract agreement system 100 operates. It is assumed herein that all the terminals receive a transaction having undergone the approval work by an approval apparatus, and always have an up-to-date blockchain stored therein. In addition, each involved party except for an intervening party has the same electronic contract to be agreed on in advance, converts the contract into a hash value, and retain the hash value in the terminal in advance. While the conversion of a contract into a hash value aims to prevent falsification before the conclusion and to hide the content of the contract from third parties, it suffices if the content of the contract shown by the transaction can be checked against that of the contract to be agreed on. For this reason, the hash value of a contract can be substituted by the ID of the contract.

In the present embodiment, evidence of contract agreement is left by the following procedure: "a chain of transactions is started at an issuing party, transactions are generated by involved parties, the contract transactions are linked, and the chain is returned to the issuing party in the end". The content of a transaction generated is as illustrated in FIG. 2, and the history of agreements by involved parties can be traced back using, for example, the hash value of the previous transaction. In the present embodiment, it is the intervening party who provides the issuing party with a previous transaction that the issuing party needs to generate a transaction.

First, the intervening-party terminal 5 generates a transaction directed to the issuing party (Step S201). This transaction is, as described earlier, broadcasted on the P2P network, then collected, approved, and linked by an approval terminal, and synchronized among the other terminals. This process is performed every time a transaction is broadcasted. A description for this is omitted hereinbelow.

Next, the issuing-party terminal 1 refers to the transaction from the intervening party and generates a transaction which includes the hash value of the contract and is directed from the issuing party to an agreeing party A (Step S202). In this event, the state of agreement, which is indicated by a boolean value or a particular value, is also included in the transaction.

Next, the agreeing-party terminal 3a retrieves the transaction directed thereto from the up-to-date blockchain, and checks whether the hash value of the contract included in the transaction matches the hash value of the contract that the agreeing-party terminal 3a retains (Step S203).

After confirming the identity of the contract, the agreeing-party terminal 3a then performs, as a proof of an agreement on the contract, verification of the electronic signature and recalculation of the hash value of the transaction, and generates a transaction which includes the hash value of the contract and the status of agreement and is directed to another party, the agreeing party B (Step S204).

Next, the agreeing party B performs the contract confirmation process in the same manner as the agreeing party A (Step S205), and generates a transaction directed to the issuing party as evidence of agreement confirmation (Step S206). If there are other agreeing parties, those agreeing parties also check the hash values of the contract against each other and generate a transaction, so that the transaction is added to the chain.

Thereafter, the issuing-party terminal 1 too check the hash values of the contract against each other to confirm whether all the involved parties have agreed on the contract (Step S207).

Finally, the issuing-party terminal 1 generates a transaction to the intervening party as a proof of having the evidence of agreement on the target contract (Step S208). This aims to guarantee that the issuing party at the start of the chain has confirmed agreement on the contract and that no more transactions are to be linked by the involved parties by re-making of an agreement or the like.

The above is how the contract agreement system 100 operates.

Figure 6:
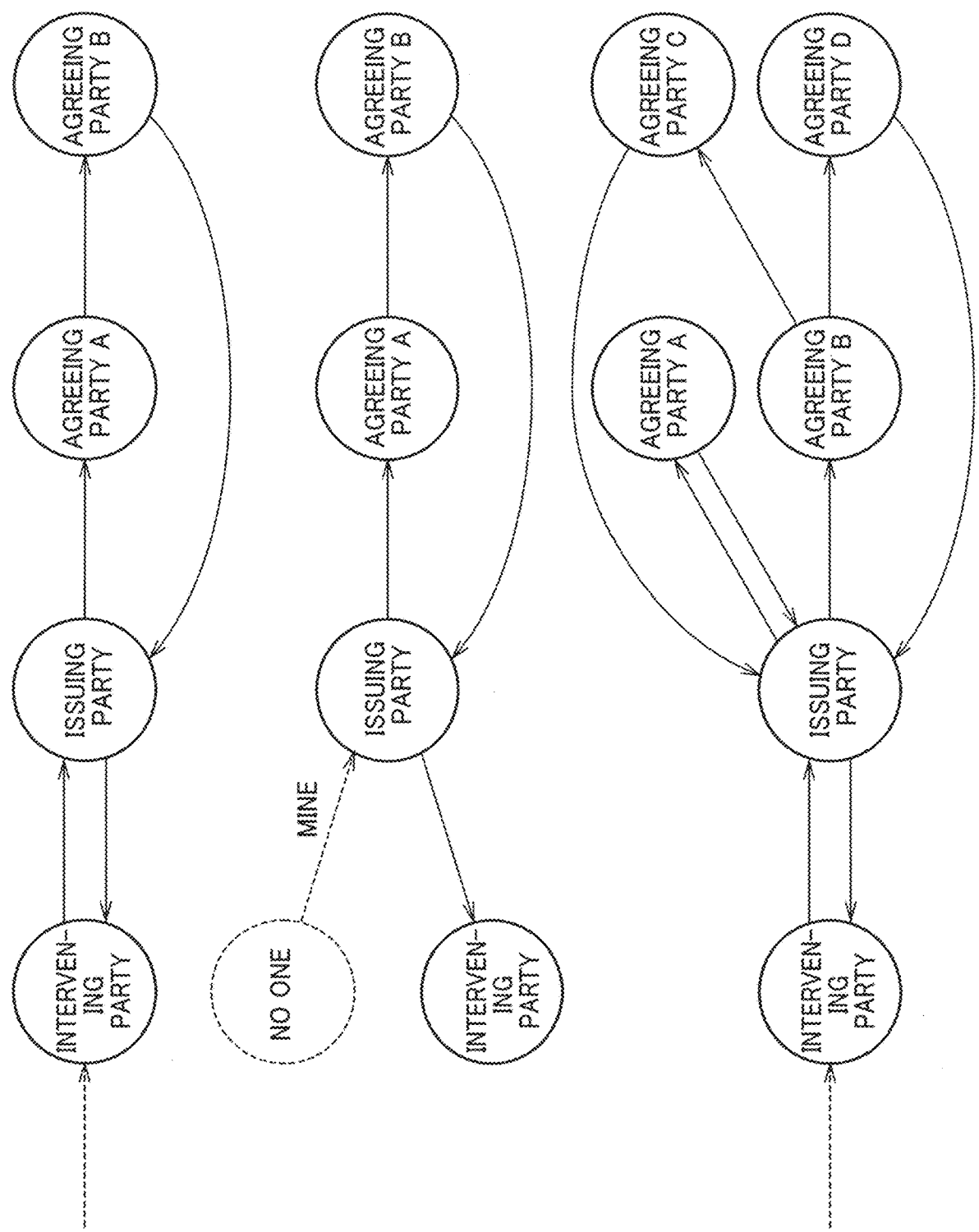
FIG. 6, are diagrams illustrating examples of transition patterns of transaction destinations.

A description is given now of transition patterns of transaction destinations. While various transition patterns are possible, the transition pattern of FIG. 6(a) corresponds to the case of FIG. 5. Other transition patterns, such as the ones in FIGS. 6(b) and 6(c), are also possible. FIG. 6(b) indicates that the first transaction received by the issuing party is not a transaction received from the intervening party, but a transaction generated as a reward of approval work or the like. Virtual currency assumes such a transition pattern that a third party on the P2P network collects transactions and links them as a new blockchain to do transaction approval work and receive (or "mine") a new coin (transaction) as a reward. FIG. 6(c) indicates a case of a more complicated agreement formation topology. A transaction of virtual currency can designate a plurality of inputs (senders) and a plurality of outputs (receivers) of N:N. Specifically, a transaction can be caused to branch and outputted, or a plurality of inputs can be added together and caused to converge into one output. Thus, agreement formation with complicated routes, like the one in FIG. 6(c), can also be set, and even if there is branching of the route along the way, the end of the chain of transactions returns to the issuing party, so that agreement by the involved parties can be proved.

As described above, even if the route of necessary agreement formation varies, evidence of contract agreement by the involved parties can be left on the P2P network when the issuing party is always at the end of the chain of transactions and passes a transaction to a designated third party (an intervening party) as a guarantee of agreement confirmation.

Figure 7:
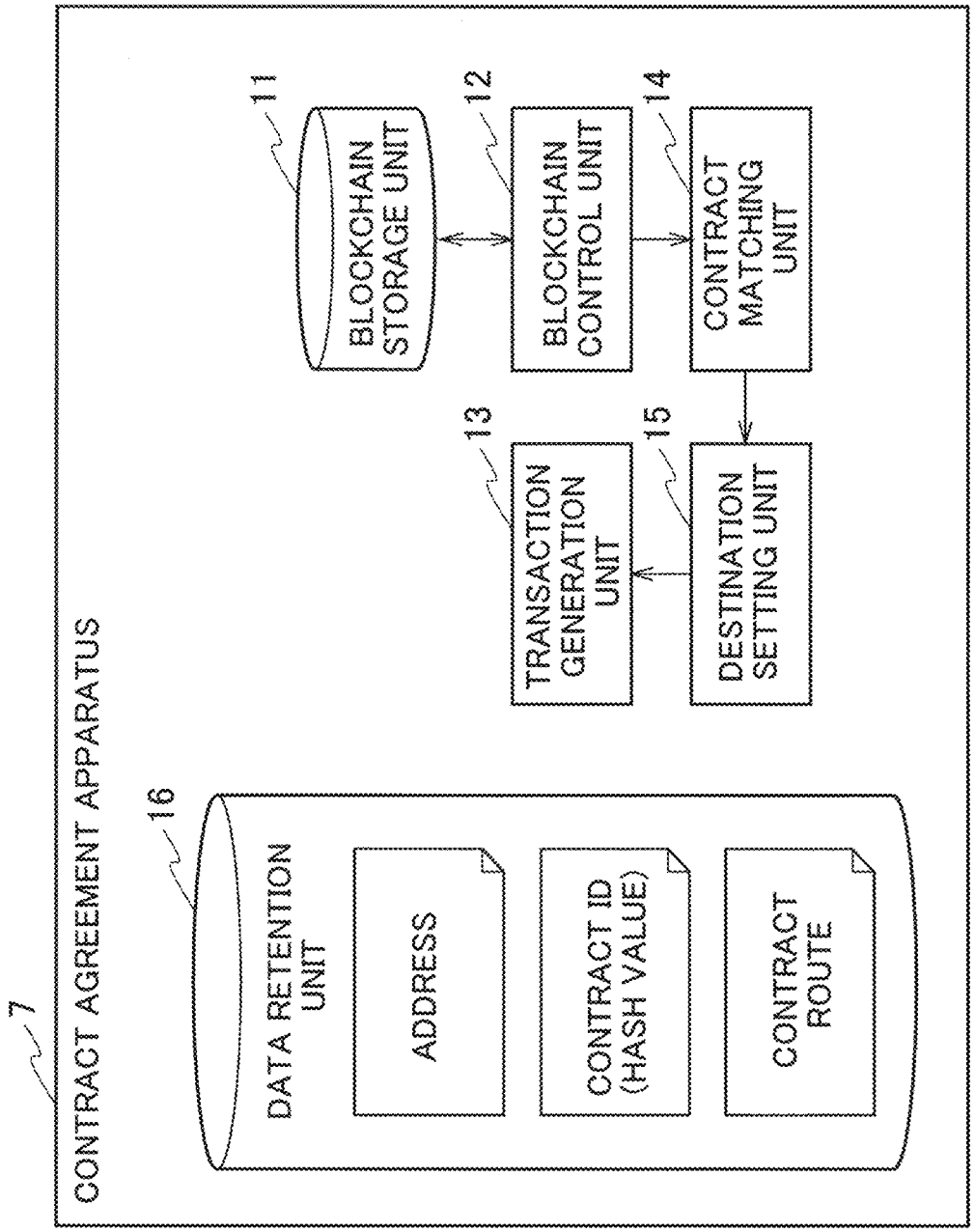
FIG. 7 is a diagram illustrating the functional blocks of a contract agreement apparatus according to the first embodiment.

Next, with reference to FIG. 7, a detailed description is given of a terminal (a contract agreement apparatus) constituting the contract agreement system 100. This contract agreement apparatus 7 is an apparatus used by each of an intervening party, an issuing party, and an agreeing party, and is configured including the blockchain storage unit 11, the blockchain control unit 12, a contract matching unit 14, a destination setting unit 15, the transaction generation unit 13, and a data retention unit 16.

The data retention unit 16 has a function to retain various kinds of data necessary for generation of a transaction. Each apparatus has its own unique address, and for example, as in the virtual currency mechanism, retains, as an address, the hash value of a public key that pairs with a secret key necessary for an electronic signature. The data retention unit 16 also retains a contract ID for identifying a contract to be agreed on. For example, the contract ID is a value that can be checked against a contract by use of the hash value of the contract. The data retention unit 16 further retains a contract route. A contract route describes the addresses of the terminals of the issuing party, agreeing parties, and intervening party, as well as transaction destinations for implementing the route of a transition pattern selected.

The blockchain storage unit 11 has a function to store a blockchain approved by an approval terminal, linked to the previous blockchain, and synchronized among the other apparatuses.

The blockchain control unit 12 has a function to keep the blockchain in the blockchain storage unit 11 up to date by cooperating with the blockchain control units of the other apparatuses in an autonomous decentralized manner, or in other words, a synchronization function to update the existing blockchain with a linked, up-to-date blockchain. The blockchain control unit 12 also has a function to acquire the blockchain from the blockchain storage unit 11 and refers to a transaction directed to the address of the host apparatus.

The contract matching unit 14 has a function to, when the last-linked transaction of the previous user is directed to the host apparatus, compare the contract ID included in the transaction and the contract ID in the data retention unit 16 to see if these contract IDs match.

The destination setting unit 15 has a function to identify the destination of the next transaction by referring to the contract route and addresses in the data retention unit 16 and convey the destination to the transaction generation unit 13.

The transaction generation unit 13 has a function to, when two contract IDs compared match, generate a transaction on the agreeing party of the host apparatus using the destination conveyed from the destination setting unit 15 and broadcast the transaction to the P2P network, the transaction including the contract ID, an indication of agreement or disagreement, an electronic signature by the agreeing party, and the like.

Next, a description is given of how the contract agreement apparatus 7 operates.

First, after an approval terminal approves and links a transaction broadcasted to the P2P network, the blockchain control unit 12 receives the blockchain to which the transaction has been linked and updates the blockchain in the blockchain storage unit 11 (Step S301).

Next, the blockchain control unit 12 acquires the up-to-date blockchain from the blockchain storage unit 11 and refers to the transaction of the previous user (Step S302).

Next, if the last-linked transaction of the previous user is directed to the host apparatus, the contract matching unit 14 compares the contract ID included in the transaction and the contract ID in the data retention unit 16 (Step S303).

Then, if the two contract IDs thus compared match, the destination setting unit 15 identifies the destination of the next transaction by referring to the contract route and addresses in the data retention unit 16 (Step S304).

Lastly, the transaction generation unit 13 generates a transaction by using the identified destination and broadcasts it to the P2P network, the transaction including the contract ID, an indication of agreement or disagreement by the agreeing party having the host apparatus, an electronic signature of the agreeing party, and the like (Step S305).

The above is how the contract agreement apparatus 7 operates. In the present embodiment, the contract agreement apparatus 7 having such functions is owned by each of the parties, such as agreeing parties, and links its transaction to transactions of the other parties, and the last contract agreement apparatus generates a transaction directed to the contract agreement apparatus of the issuing party who has issued the contract. Thus, the users of the contract agreement system 100 can leave evidence of their contract agreement on the blockchain (on the P2P network) only by setting, in their contract agreement apparatuses, addresses, a contract route, a contract ID, an indication of agreement or disagreement, an electronic signature, and the like.

Lastly, a description is given of an agreement verification apparatus. Evidence of contract agreement left on a blockchain can be easily verified by any terminal or apparatus on the P2P network as long as the system of the blockchain exists. An agreement verification apparatus used for such later verification of agreement is now described.

Figure 8:
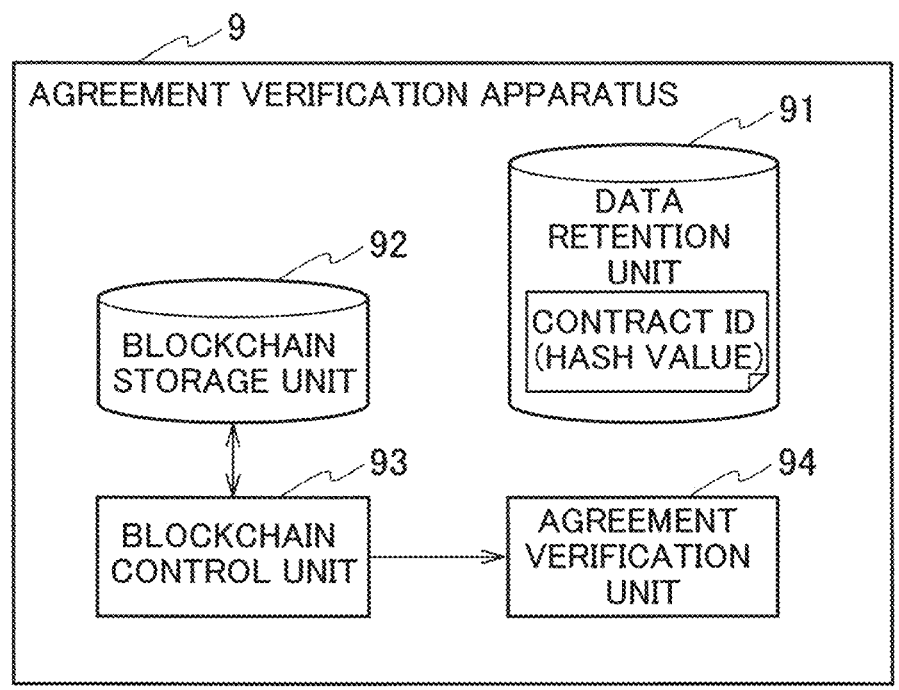
FIG. 8 is a diagram illustrating the functional blocks of an agreement verification apparatus.

As illustrated in FIG. 8, an agreement verification apparatus 9 is configured including a data retention unit 91, a blockchain storage unit 92, a blockchain control unit 93, and an agreement verification unit 94. The functional units except for the agreement verification unit 94 have the same functions as the functional units of the same names in the contract agreement apparatus 7.

The agreement verification unit 94 has a function to compare the address (the hash value of a public key for an electronic signature) included in the transaction at the start of a chain with the address of the apparatus that received the transaction at the end of the chain, and based on whether these two addresses match, determine whether there is evidence of contract agreement.

Next, a description is given of how the agreement verification apparatus 9 operates.

First, the blockchain control unit 93 acquires a contract ID to be verified from the data retention unit 91 and retrieves a corresponding chain of transactions from the blockchain storage unit 92 (Step S401).

Next, the agreement verification unit 94 compares the address included in the first transaction at the start of the retrieved chain of transactions with the address that received the transaction at the end of the chain, and based on the comparison result, determines whether there is evidence of agreement (Step S402). Verification of evidence of contract agreement can be made by checking whether the last transaction has been transmitted to the address of the designated intervening party.

Then, if these two addresses match, the agreement verification unit 94 displays, as a verification result, an indication that there is evidence of contract agreement (Step S403). In this event, the content of parameters included in the transaction may be displayed together. For example, if the status of agreement returned to the issuing party is false (disagreement) as shown in FIG. 2, the agreement verification unit 94 also displays an indication that the agreeing party A does not agree.

According to the present embodiment described above, the contract agreement apparatuses of the parties involved in making a contract form a chain of transactions of the respective involved parties, and the last apparatus generates a transaction directed to the apparatus of the issuing party who has issued the contract. Thus, evidence of contract agreement among two or more parties can be recorded on a blockchain by a simpler method, without a complicated procedure. Further, the present invention retains evidence of contract agreement on an autonomous decentralized network without using a centralized system. Thus, even if any of the apparatuses loses the evidence of agreement, the evidence can be retained permanently as long as the system of the corresponding blockchain exists.

Although the present embodiment uses an example where the addresses of a sender and a receiver are the hash values of the public keys of the sender and receiver as shown in FIG. 2, any values may be used instead of the hash values of public keys as shown in FIG. 9.

Further, although the present embodiment uses the P2P network as an example, the network used does not necessarily have to have a pure, literal peer-to-peer configuration. For example, a node to serve as a hub exists in recent Bitcoin, and broadly, the network only has to be a distributed network over which blockchains are shared.

Lastly, the contract agreement apparatus 7 and the agreement verification apparatus 9 described in the present embodiment can be implemented by computers each including computation capability such as a CPU and storage capability such as memory. It is also possible to create programs for causing the computers to function as the respective apparatuses, as well as storage media for storing such programs.

Second Embodiment

In the present invention, for the security of the content of a contract, the terminals of involved parties each use not only the key pair for an electronic signature, but also a key pair for encryption of the contract. The receiver of a transaction sends an encryption key of the key pair as a public key to the sender of the transaction in advance. The sender, meanwhile, encrypts the contract using the encryption key sent from the receiver, and generates a transaction which includes the encrypted contract and is directed to the receiver. The receiver decrypts the encrypted contract using the decryption key, i.e., the other key of the key pair that the receiver has. Basically, the issuing party at the start encrypts a contract, the receiver decrypts the contract, and when transmitting the contract to the next receiver, the receiver encrypts the contract using an encryption key of the next receiver. By repeating this, an encrypted contract decipherable only by involved parties is retained on a chain of transactions. Since individual transactions thus include a contract encrypted by the respective involved parties with different encryption keys, evidence of a contract can be left on a blockchain with credibility maintained.

Note that an encrypted contract can be decrypted only by the receiver of that transaction, and therefore even the other involved parties cannot determine whether there has been agreement on the contract. However, the last transaction is returned to the contract issuing party at the end of the chain of transactions, and this enables the issuing party to know the entire content of the contract on which the involved parties have agreed. Thus, by sequentially comparing the values of encryption data in the contract, the issuing party can be aware of changes, if any, to the content of the contract along the chain.

A mode for carrying out the invention is described below using the drawings.

Figure 10:
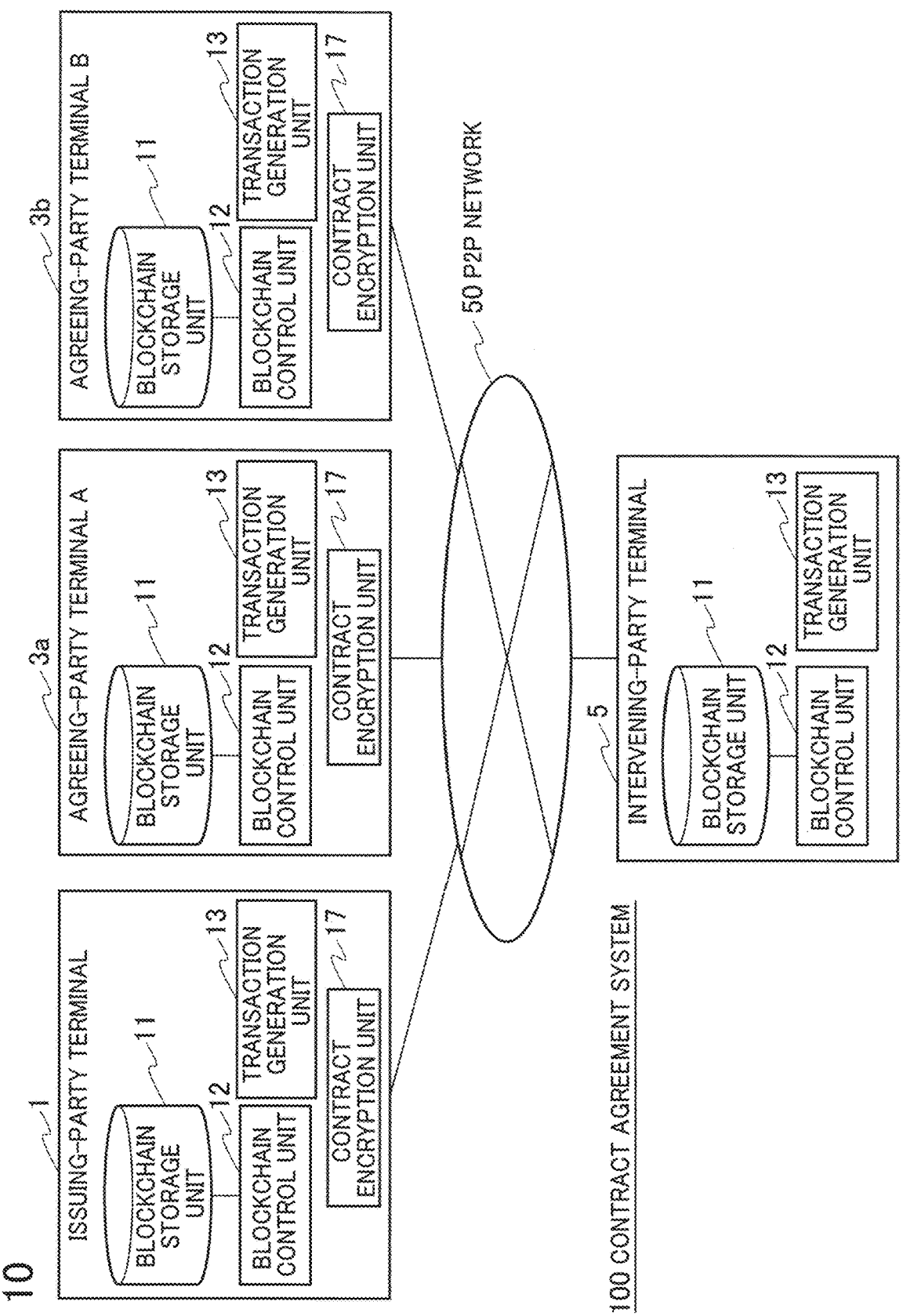
FIG. 10 is a diagram illustrating the overall configuration of a contract agreement system according to a second embodiment.

With reference to FIG. 10, a description is first given of the overall configuration of a contract agreement system 100. The contract agreement system 100 is, as that in the first embodiment, configured including an issuing-party terminal 1 used by a contract issuing party, two agreeing-party terminals 3a, 3b used respectively by two agreeing parties, and an intervening-party terminal 5 used by an intervening party. All these terminals are connected in an autonomous decentralized manner over a P2P network 50 over which blockchains are shared.

Each terminal includes common functional units, namely, a blockchain storage unit 11, a blockchain control unit 12, a transaction generation unit 13, and a contract encryption unit 17. Other functional units will be described later.

The blockchain storage unit 11 has a function to store a blockchain. A blockchain is a chain of transactions where transactions each showing evidence of agreement on a contract to be agreed on are linked together as blocks.

The blockchain control unit 12 has a function to keep the up-to-date blockchain retained in the blockchain storage unit 11 up to date by cooperating with the blockchain control units of the other terminals in an autonomous decentralized manner. The blockchain control unit 12 also has a function to acquire the blockchain from the blockchain storage unit 11 and provide it to either the transaction generation unit 13 or the contract encryption unit 17.

The transaction generation unit 13 has a function to, after confirmation of the authentication of a transaction of a previous user for example, generate a transaction of the user of the host terminal and broadcast the generated transaction to the P2P network 50.

The contract encryption unit 17 has a function to generate a key pair, which is formed by a pair of an encryption key and a decryption key, and transmit the encryption key as a public key to another terminal. The contract encryption unit 17 also has a function to encrypt a contract (a contract document) using an encryption key transmitted from another terminal.

A detailed description is now given of a transaction. The present embodiment identifies a contract to be agreed on, records agreements by involved parties on the contract, and to make the content of the contract confidential, adds the (encrypted) contract and the status of agreement to a conventional transaction as illustrated in FIG. 11. In other words, a transaction used in the present embodiment additionally includes information on an encrypted contract to be agreed on and information on agreement by an involved party on the contract to be agreed on, and the transaction is regarded as contract agreement proof data electronically signed by the sender. Thus, whether the involved parties have agreed on the contract can be recorded with the conventional mode of one electronic signature per transaction maintained. In addition, encryption of a contract enables the content of the contract to be retained with high credibility.

The above are the functions of the terminals constituting the contract agreement system 100. Although not shown in FIG. 10, as in the case of virtual currency, an approval terminal that performs linkage for a blockchain through transaction approval work is present on the P2P network 50 to maintain the system of the blockchain.

Next, a description is given of how the contract agreement system 100 operates. An operation for forming a blockchain is the same as that described in the first embodiment, and is not described here.

Figure 12:
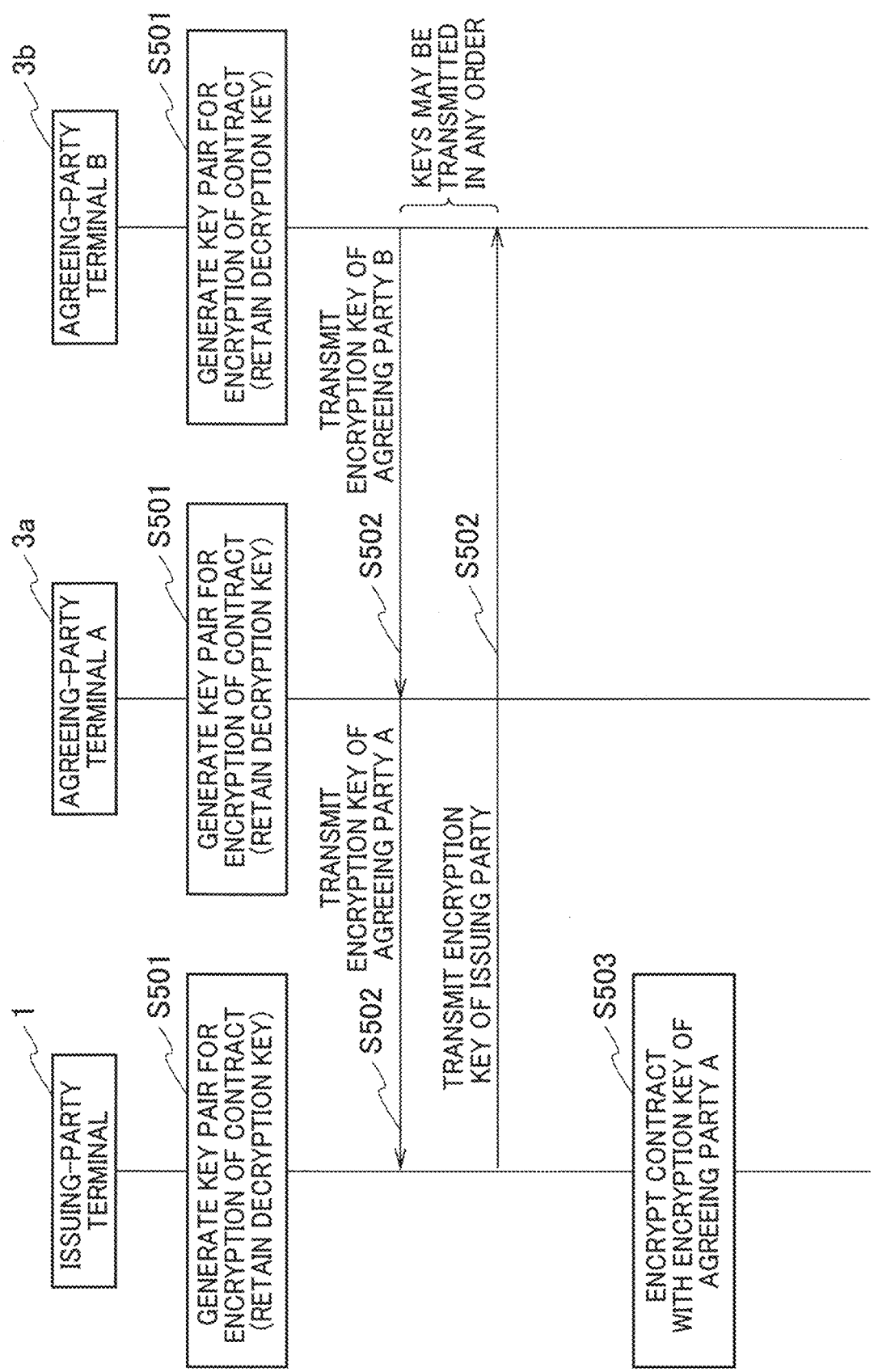
FIG. 12 is a diagram illustrating a preliminary operation performed before contract agreement according to the second embodiment.

First, a preliminary operation performed before a procedure of contract agreement is described using FIG. 12. It is assumed that the issuing party and all the agreeing parties have the same electronic contract to be agreed on, in advance. It is also assumed that, as in the case of virtual currency, each terminal has already performed generation of a key pair for an electronic signature, notification of its own address to the terminals, and the like as a preliminary to using a blockchain.

First, the issuing-party terminal 1, the agreeing-party terminal 3a, and the agreeing-party terminal 3b each generate a key pair for encryption of a contract to be agreed on (Step S501).

Next, each of these terminals saves the decryption key of the generated key pair, and transmits the pairing encryption key to the sender of a transaction (Step S502). Any transmission route or transmission method may be used. A blockchain or the P2P network does not necessarily have to be used, and the sender may be notified of the encryption key by email or by voice using the Internet or a telephone line. Also, the encryption keys may be transmitted in any order among the terminals.

Then, each terminal retains the encryption key transmitted from the receiver of its transaction. Then, the issuing-party terminal 1 that has issued the contract encrypts the contract to be agreed on using the encryption key of the agreeing-party terminal 3a (Step S503).

Figure 13:
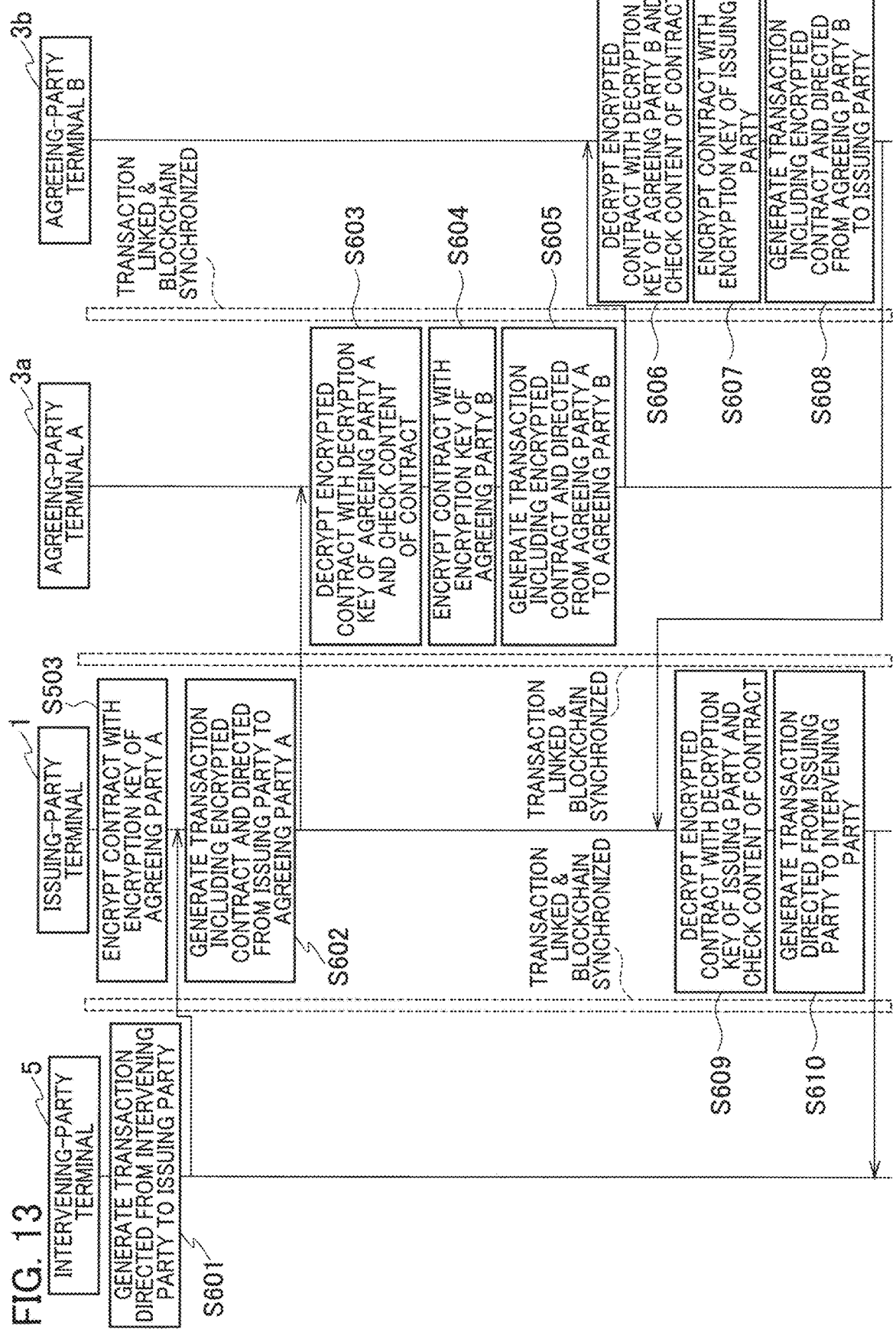
FIG. 13 is a diagram illustrating the overall operation performed by the contract agreement system according to the second embodiment.

Next, using FIG. 13, a description is given of a blockchain generation operation performed following the preliminary operation in FIG. 12. It is assumed that all the terminals receive a transaction having undergone approval work by an approval terminal, and always have an up-to-date blockchain stored therein.

In the present embodiment, evidence of contract agreement is left by the following procedure: "a chain of transactions is started at an issuing party, transactions are generated by involved parties, the contract transactions are linked, and the chain is returned to the issuing party in the end". The content of a transaction generated is as illustrated in FIG. 11, and the history of agreements by involved parties can be traced back using the hash value of the previous transaction or the like. In the present embodiment, it is the intervening party who provides the issuing party with a previous transaction that the issuing party needs to generate a transaction.

First, the intervening-party terminal 5 generates a transaction directed to the issuing party (Step S601). This transaction is, as described in the first embodiment, broadcasted to the P2P network, then collected, approved, and linked by an approval terminal, and synchronized among the other terminals. This process is performed every time a transaction is broadcasted. A description for this is omitted hereinbelow.

Next, the issuing-party terminal 1 refers to the transaction from the intervening party and generates a transaction which includes the contract encrypted with the encryption key of an agreeing party A and is directed from the issuing party to the agreeing party A (Step S602). In this event, the state of agreement, which is indicated by a boolean value or a particular value, is also included in the transaction.

Next, the agreeing-party terminal 3a retrieves the transaction directed thereto from the up-to-date blockchain, and checks the identity of the contract by decrypting the encrypted contract included in the transaction with its own decryption key and comparing the decrypted contract with the contract retained in itself (Step S603).

After confirming the identity of the contract, the agreeing-party terminal 3a then re-encrypts the contract using the encryption key of the agreeing party B (Step S604).

Thereafter, the agreeing-party terminal 3a performs, as a proof of agreement on the contract, verification of the electronic signature and recalculation of the hash value of the transaction, and generates a transaction which is directed to the agreeing party B and includes the status of agreement and the contract encrypted using the encryption key of the agreeing party B (Step S605).

Next, the agreeing party B decrypts the contract included in the transaction of the agreeing party A using its own decryption key and performs the contract check work in the same manner as the agreeing party A (Step S606), re-encrypts the contract using the encryption key of the issuing party (Step S607), and generates a transaction directed to the issuing party as evidence of agreement confirmation (Step S608). If there are other agreeing parties, those agreeing parties also check contracts against each other and generate a transaction, so that the transaction is added to the chain.

Thereafter, the issuing-party terminal 1 too decrypts the contract included in the transaction of the agreeing party B using its own decryption key and performs the contract check work to check whether all the involved parties have agreed on the contract (Step S609). In this regard, if there is any discrepancy from the content of the initially-issued contract, the issuing party can be aware that the contract has been falsified anywhere along the route. As a possible method for this checking, the issuing party may, for example, store the hash value of a contract when first issuing the contract and compare this hash value with the hash value of the contract included in the transaction from the agreeing party B to check the identity of the contract based on whether the hash values match.

Lastly, the issuing-party terminal 1 generates a transaction directed to the intervening party as a proof that the issuing party has attained the evidence of agreements on the target contract and that the contract has not been falsified (Step S610). The aim of this is for the issuing party at the start of the chain to check the agreements on the contract and guarantee that no more transactions will be linked among the involved parties by re-making of an agreement or the like. Further, the encrypted contracts included in the respective transactions are encrypted with different keys. Thus, even if a third party later tries to check the agreement, the third party cannot check whether the agreement has been made on the same document. For this reason, the issuing party that receives the last transaction needs to leave the evidence of having checked for falsification, and this corresponds to the transaction directed to the intervening party.

The above is how the contract agreement system 100 operates.

Note that the transition patterns of transaction destinations are the same as those described in the first embodiment, and are therefore not described here.

As described above, even if a route of necessary agreement formation varies, evidence of contract agreement among the involved parties can be left on the P2P network when the issuing party is always at the end of the chain of transactions and passes a transaction to a designated third party (an intervening party) as a guarantee of agreement confirmation. Further, encryption of a contract allows the content of the contract to be retained with high credibility.

Figure 14:
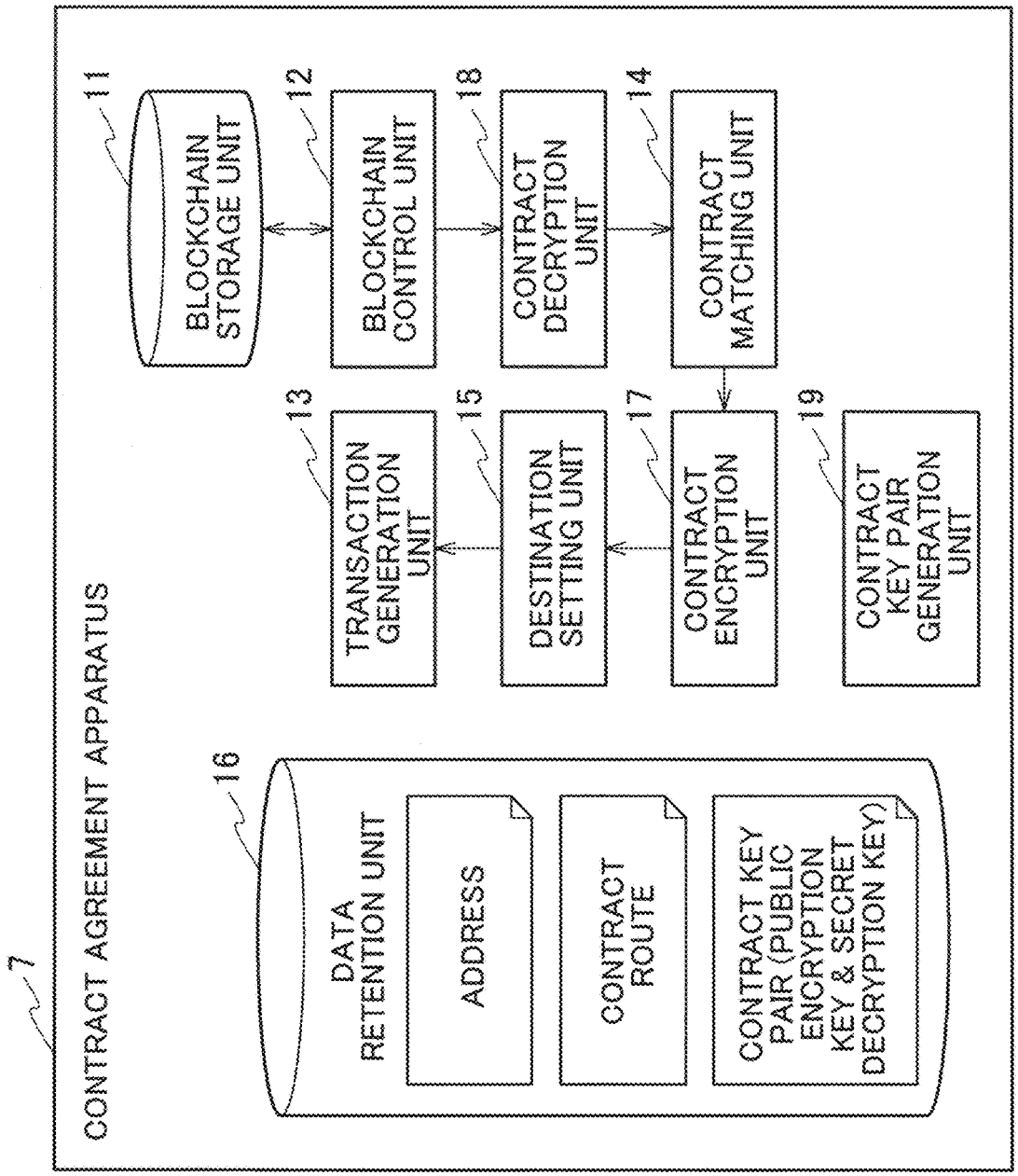
FIG. 14 is a diagram illustrating the functional blocks of a contract agreement apparatus according to the second embodiment.

Next, with reference to FIG. 14, a detailed description is given of a terminal (a contract agreement apparatus) constituting the contract agreement system 100. This contract agreement apparatus 7 is an apparatus used by each of an intervening party, an issuing party, and an agreeing party, and is configured including the blockchain storage unit 11, the blockchain control unit 12, a contract decryption unit 18, the contract matching unit 14, the contract encryption unit 17, a destination setting unit 15, the transaction generation unit 13, a contract key pair generation unit 19, and a data retention unit 16.

The data retention unit 16 has a function to retain various kinds of data necessary for generation of a transaction. Each apparatus has its own unique address, and for example, as in the virtual currency mechanism, retains, as an address, the hash value of a public key that pairs with a secret key necessary for an electronic signature. The data retention unit 16 also retains a contract route. A contract route describes the addresses of the terminals of the issuing party, agreeing parties, and intervening party, as well as transaction destinations for implementing the route of a transition pattern selected. The data retention unit 16 further retains a contract key pair for encryption of a contract.

The blockchain storage unit 11 has a function to store a blockchain approved by an approval terminal, linked to the previous blockchain, and synchronized among the other apparatuses.

The blockchain control unit 12 has a function to keep the up-to-date blockchain in the blockchain storage unit 11 up to date by cooperating with the blockchain control units of the other apparatuses in an autonomous decentralized manner, or in other words, a synchronization function to update the existing blockchain with a linked, up-to-date blockchain. The blockchain control unit 12 also has a function to acquire the blockchain from the blockchain storage unit 11 and refers to a transaction directed to the address of the host apparatus.

The contract decryption unit 18 has a function to, when the last-linked transaction from the previous user is directed to the host apparatus, decrypt the contract included in the transaction with a decryption key in the data retention unit 16.

The contract matching unit 14 has a function to compare the decrypted contract with the contract retained therein to see if these contracts match.

The contract encryption unit 17 has a function to, when two compared contracts match, encrypt the contract with the encryption key transmitted from another apparatus.

The destination setting unit 15 has a function to identify the destination of the next transaction by referring to the contract route and addresses in the data retention unit 16 and convey the destination to the transaction generation unit 13.

The transaction generation unit 13 has a function to generate a transaction of the agreeing party of the host apparatus using the destination conveyed from the destination setting unit 15 and broadcast the transaction to the P2P network, the transaction including the encrypted contract, an indication of agreement or disagreement, an electronic signature by the agreeing party, and the like.

The contract key pair generation unit 19 has a function to generate a contract key pair formed by a pair of an encryption key and a decryption key, store the pair in the data retention unit 16, and transmit only the encryption key to another apparatus as a public key. As described earlier, this function may be implemented by the contract encryption unit 17.

Next, a description is given of how the contract agreement apparatus 7 operates.

First, after an approval terminal approves and links a transaction broadcasted to the P2P network, the blockchain control unit 12 receives the blockchain to which the transaction has been linked and updates the blockchain in the blockchain storage unit 11 (Step S701).

Next, the blockchain control unit 12 acquires the up-to-date blockchain from the blockchain storage unit 11 and refers to the transaction of the previous user (Step S702).

Next, if the last-linked transaction of the previous user is directed to the host apparatus, the contract decryption unit 18 decrypts the contract included in the transaction with its own decryption key retained in the data retention unit 16 (Step S703).

Next, the contract matching unit 14 compares the decrypted contract with the contract retained in itself (Step S704). In this regard, the contracts may be checked visually by the user, or matched against each other using, for example, the hash value of the contract checked and acquired in advance.

Then, when the two contracts thus compared match, the contract encryption unit 17 re-encrypts the contract using the encryption key transmitted from another apparatus (Step S705).

Thereafter, the destination setting unit 15 identifies the destination of the next transaction by referring to the contract route and addresses in the data retention unit 16 (Step S706).

Lastly, the transaction generation unit 13 generates a transaction by using the identified destination and broadcasts it to the P2P network, the transaction including the re-encrypted contract, an indication of agreement or disagreement by the agreeing party having the host apparatus, an electronic signature of the agreeing party, and the like (Step S707).

The above is how contract agreement apparatus 7 operates. In the present embodiment, the contract agreement apparatus 7 having such functions is owned by each of parties, such as agreeing parties, and links its transaction to transactions of the other parties, and the last contract agreement apparatus generates a transaction directed to the contract agreement apparatus of the issuing party who has issued the contract. Also, the contract agreement apparatus 7 encrypts the contract included in the transaction using an encryption key of the receiver. Thereby, the users of the contract agreement system 100 can leave evidence of contract agreement on the blockchain (on the P2P network) with credibility maintained only by setting, in their contract agreement apparatuses, addresses, a contract route, a contract, a contract key pair, an indication of agreement or disagreement, an electronic signature, and the like.

Lastly, a description is given of an agreement verification apparatus. Evidence of contract agreement left on a blockchain can be easily verified by any terminal or apparatus on the P2P network as long as the system of the blockchain exists. An agreement verification apparatus used for such later verification of agreement is now described.

As illustrated in FIG. 8, an agreement verification apparatus 9 of the present embodiment is also configured including a data retention unit 91, a blockchain storage unit 92, a blockchain control unit 93, and an agreement verification unit 94. The functional units except for the data retention unit 91 and the agreement verification unit 94 have the same functions as the functional units of the same names in the contract agreement apparatus 7.

The data retention unit 91 retains a contract ID for identifying a contract. For example, the contract ID is a value that can be checked against a contract by use of the hash value of the contract.

The agreement verification unit 94 has a function to compare the address (the hash value of a public key for an electronic signature) included in the transaction at the start of a chain with the address of the apparatus that received the transaction at the end of the chain, and based on whether these two addresses match, determine whether there is evidence of contract agreement.

Next, a description is given of how the agreement verification apparatus 9 operates.

First, the blockchain control unit 93 acquires a contract ID to be verified from the data retention unit 91 and retrieves a corresponding chain of transactions from the blockchain storage unit 92 (Step S801).

Next, the agreement verification unit 94 compares the address included in the transaction at the start of the retrieved chain of transactions with the address that received the transaction at the end of the chain, and based on the comparison result, determines whether there is evidence of agreement (Step S802). Verification of evidence of contract agreement can be made by checking whether the last transaction has been transmitted to the address of the designated intervening party.

Then, if these two addresses match, the agreement verification unit 94 displays, as a verification result, an indication that there is evidence of contract agreement (Step S803). In this event, the content of parameters included in the transaction may be displayed together. For example, if the status of agreement returned to the issuing party is false (disagreement) as shown in FIG. 11, the agreement verification unit 94 also displays an indication that the agreeing party A does not agree.

According to the present embodiment described above, the contract agreement apparatuses of the parties involved in making a contract form a chain of transactions of the involved parties, and the last apparatus generates a transaction directed to the apparatus of the issuing party who has issued the contract. Thus, evidence of contract agreement among two or more parties can be recorded on a blockchain by a simpler method, without a complicated procedure. Further, the present invention retains evidence of contract agreement on an autonomous decentralized network without using a centralized system. Thus, even if any of the apparatuses loses the evidence of agreement, the evidence can be retained permanently as long as the system of the corresponding blockchain exists.

In addition, the present embodiment encrypts a contract and retains it on a blockchain. Thus, even if each terminal does not retain the content of the contract, the terminal can decipher the encrypted contract included in the transaction directed thereto as long as the terminal has a decryption key. Since no decryption key is passed between involved parties, the content of a contract can be retained with high credibility.

Although the present embodiment uses an example where the addresses of a sender and a receiver are the hash values of the public keys of the sender and receiver as shown in FIG. 11, any values may be used instead of the hash values of public keys as shown in FIG. 15.

Further, although the present embodiment uses the P2P network as an example, the network used does not necessarily have to have a pure, literal peer-to-peer configuration. For example, a node to serve as a hub exists in recent Bitcoin, and broadly, the network only has to be a distributed network over which blockchains are shared.

Lastly, the contract agreement apparatus 7 and the agreement verification apparatus 9 described in the present embodiment can be implemented by computers each including computation capability such as a CPU and storage capability such as memory. It is also possible to create programs for causing the computers to function as the respective apparatuses, as well as storage media for storing such programs.

EXPLANATION OF THE REFERENCE NUMERALS 1 issuing-party terminal 1
3a, 3b agreeing-party terminal
5 intervening-party terminal
7 contract agreement apparatus
9 agreement verification apparatus
11 blockchain storage unit
12 blockchain control unit
13 transaction generation unit
14 contract matching unit
15 destination setting unit
16 data retention unit
17 contract encryption unit
18 contract decryption unit
19 contract key pair generation unit
50 P2P network
91 data retention unit
92 blockchain storage unit
93 blockchain control unit
94 agreement verification unit
100 contract agreement system
S101 to S106, S201 to S208, S301 to S305, S401 to S403, S501 to S503, S601 to S610, S701 to S707, S801 to S803 step

The invention claimed is:

1. A contract agreement method performed among a plurality of apparatuses corresponding to respective agreeing parties of a contract to be agreed on and connected to a distributed network over which a blockchain is shared, the method comprising, by each apparatus of the plurality of apparatuses that corresponds to an agreeing party of the contract:

storing in a storage device a blockchain which is a chain of transactions linked as blocks, the transactions each indicating evidence of agreement on the contract;

in response to determining that a transaction of a previous agreeing party last-linked to the blockchain is directed to the apparatus, comparing an identifier of a contract included in the transaction with an identifier of the contract to be agreed on;

in response to determining that the identifier of the contract included in the transaction matches the identifier of the contract to be agreed on, generating a transaction directed to another apparatus among the plurality of apparatuses that corresponds to another agreeing party and broadcasting the generated transaction to the network for the generated transaction to be receivable by every device on the network, the generated transaction including at least a proof of agreement or disagreement on the contract by the agreeing party corresponding to the apparatus, an electronic signature of the agreeing party, and the identifier of the contract to be agreed on; and updating the blockchain in the storage device with a blockchain in which the generated transaction is linked to the transaction of the previous agreeing party, wherein the plurality of apparatuses link transactions of their respective agreeing parties involved in making the contract, and a last apparatus among the plurality of apparatuses to perform the linking generates a transaction directed to an apparatus of an issuing party who has issued the contract.

2. The contract agreement method according to claim 1, the method further comprising, by each of the plurality of apparatuses:

generating an encryption key and a decryption key for the contract;

when a transaction of a previous user last-linked to the blockchain is directed to the apparatus, decrypting a contract included in the transaction with the decryption key of the apparatus; and when the decrypted contract and the contract to be agreed on match each other, encrypting the contract to be agreed on using an encryption key of a different apparatus, wherein the broadcasting includes generating a transaction directed to the different apparatus and broadcasting the generated transaction to the network, the transaction including at least a proof of agreement or disagreement by a user of the apparatus on the contract, an electronic signature of the user of the apparatus, and the encrypted contract.

3. The contract agreement method according to claim 2, wherein based on whether the contract decrypted with the decryption key of the apparatus matches the contract to be agreed on, the apparatus of the issuing party checks identity of the contract to be concluded.

4. The contract agreement method according to claim 1, wherein the apparatus of the issuing party generates a transaction directed to a third party as a proof of attainment of evidence of agreement on the contract.

5. The contract agreement method according to claim 1, wherein the network is a P2P (Peer to Peer) network.

6. The contract agreement method according to claim 1, wherein existence of an agreement on the contract is verifiable based on determining whether a public key for an electronic signature included in a transaction at a start of the chain matches a public key for an electronic signature of a user of the apparatus that has received a transaction at an end of the chain.

7. A contract agreement system comprising a plurality of apparatuses corresponding to respective agreeing parties of a contract to be agreed on and connected to a distributed network over which a blockchain is shared, wherein each apparatus of the plurality of apparatuses that corresponds to an agreeing party of the contract comprises:

a storage device that stores a blockchain which is a chain of transactions linked as blocks, the transactions each indicating evidence of agreement on the contract;
a processor;
a storage media having programs which, when executed by the processor, causes the processor to perform operations comprising:
comparing, in response to determining that a transaction of a previous agreeing party last-linked to the blockchain is directed to the apparatus, an identifier of a contract included in the transaction with an identifier of the contract to be agreed on;
generating, in response to determining that the identifier of the contract included in the transaction matches the identifier of the contract to be agreed on, a transaction directed to another apparatus among the plurality of apparatuses that corresponds to another agreeing party and broadcasting the generated transaction to the network for the generated transaction to be receivable by every device on the network, the generated transaction including at least a proof of agreement or disagreement on the contract by the agreeing party corresponding to the apparatus, an electronic signature of the agreeing party, and the identifier of the contract to be agreed on; and
updating the blockchain in the storage device with a blockchain in which the generated transaction is linked to the transaction of the previous agreeing party, and
the plurality of apparatuses link transactions of their respective agreeing parties involved in making the contract, and
a last apparatus among the plurality of apparatuses to perform the linking generates a transaction directed to the apparatus of an issuing party who has issued the contract.

8. The contract agreement system according to claim 7, wherein the operations further comprise:
generating an encryption key and a decryption key for the contract;
decrypting, when a transaction of a previous user last-linked to the blockchain is directed to the apparatus, a contract included in the transaction with the decryption key of the apparatus; and
encrypting, when the decrypted contract matches the contract to be agreed on, the contract to be agreed on using an encryption key of a different apparatus, and
the transaction including at least a proof of agreement or disagreement by a user of the apparatus on the contract, an electronic signature of the user of the apparatus, and the encrypted contract.

9. The contract agreement system according to claim 8, wherein
the apparatus of the issuing party checks identity of the contract to be concluded, based on whether the contract decrypted with the decryption key of the apparatus matches the contract to be agreed on.

10. The contract agreement system according to claim 7, wherein
the apparatus of the issuing party generates a transaction directed to a third party as a proof of attainment of evidence of agreement on the contract.

11. The contract agreement system according to claim 7, wherein the network is a P2P (Peer to Peer) network.

12. The contract agreement system according to claim 7, wherein
existence of an agreement on the contract is verifiable based on determining whether a public key for an electronic signature included in a transaction at a start of the chain matches a public key for an electronic signature of a user of the apparatus that has received a transaction at an end of the chain.

13. A contract agreement apparatus corresponding to an agreeing party of a contract to be agreed on and connected to a distributed network over which a blockchain is shared, comprising:
a storage device that stores a blockchain which is a chain of transactions linked as blocks, the transactions each indicating evidence of agreement on the contract;
a processor; and
a storage media having programs which, when executed by the processor, causes the processor to perform operations comprising:
comparing, when a transaction of a previous agreeing party last-linked to the blockchain is directed to the apparatus, an identifier of a contract included in the transaction with an identifier of the contract to be agreed on;
generating, in response to determining that the identifier of the contract included in the transaction matches the identifier of the contract to be agreed on, a transaction directed to another apparatus and broadcasting the generated transaction to the network for the generated transaction to be receivable by every device on the network, the generated transaction including at least a proof of agreement or disagreement by the agreeing party corresponding to the apparatus on the contract, an electronic signature of the agreeing party, and the identifier of the contract to be agreed on; and
updating the blockchain in the storage device with a blockchain in which the generated transaction is linked to the transaction of the previous agreeing party.

14. The contract agreement apparatus according to claim 13, wherein the operations further comprise:
generating an encryption key and a decryption key for the contract;
decrypting, when a transaction of a previous user last-linked to the blockchain is directed to the apparatus, a contract included in the transaction with the decryption key of the apparatus; and
encrypting, when the decrypted contract matches the contract to be agreed on, the contract to be agreed on using an encryption key of a different apparatus, wherein
the transaction includes at least a proof of agreement or disagreement by a user of the apparatus on the contract, an electronic signature of the user of the apparatus, and the encrypted contract.

15. The contract agreement apparatus according to claim 13, wherein
existence of an agreement on the contract can be verified based on determining whether a public key for an electronic signature included in a transaction at a start of the chain matches a public key for an electronic signature of a user of the apparatus that has received a transaction at an end of the chain.

16. A non-transitory computer-readable storage medium having program code that is stored thereon, the program code executable by one or more processing devices of an apparatus for performing operations comprising:

storing in a storage device a blockchain which is a chain of transactions linked as blocks, the transactions each indicating evidence of agreement on a contract to be agreed on;

in response to determining that a transaction of a previous agreeing party last-linked to the blockchain is directed to the apparatus, comparing an identifier of a contract included in the transaction with an identifier of the contract to be agreed on;

in response to determining that the identifier of the contract included in the transaction matches the identifier of the contract to be agreed on, generating a transaction directed to another apparatus among a plurality of apparatuses that corresponds to another agreeing party and broadcasting the generated transaction to a network for the generated transaction to be receivable by every device on the network, the generated transaction including at least a proof of agreement or disagreement on the contract by an agreeing party corresponding to the apparatus, an electronic signature of the agreeing party, and the identifier of the contract to be agreed on; and updating the blockchain in the storage device with a blockchain in which the generated transaction is linked to the transaction of the previous agreeing party, wherein the plurality of apparatuses link transactions of their respective agreeing parties involved in making the contract, and a last apparatus among the plurality of apparatuses to perform the linking generates a transaction directed to an apparatus of an issuing party who has issued the contract.

17. A non-transitory computer-readable storage medium having program code that is stored thereon, the program code executable by one or more processing devices for performing operations comprising:

determining existence of an agreement on a contract based on determining that a public key for an electronic signature included in a transaction at a start of a chain of transactions matches a public key for an electronic signature of an agreeing party corresponding to an apparatus that has received the transaction at an end of the chain, wherein the chain of transactions is generated by each of a plurality of apparatuses corresponding to respective agreeing parties of the contract by performing operations comprising:

storing in a storage device a blockchain which comprises the chain of transactions linked as blocks, the transactions each indicating evidence of the agreement on the contract;

in response to determining that a transaction of a previous agreeing party last-linked to the blockchain is directed to the apparatus, comparing an identifier of a contract included in the transaction with an identifier of the contract;

in response to determining that the identifier of the contract included in the transaction matches the identifier of the contract, generating a transaction directed to another apparatus among the plurality of apparatuses that corresponds to another agreeing party and broadcasting the generated transaction to a network for the generated transaction to be receivable by every device on the network, the generated transaction including at least a proof of agreement or disagreement on the contract by the agreeing party corresponding to the apparatus, an electronic signature of agreeing party, and the identifier of the contract; and updating the blockchain in the storage device with a blockchain in which the generated transaction is linked to the transaction of the previous agreeing party, wherein the plurality of apparatuses link transactions of their respective agreeing parties involved in making the contract, and a last apparatus among the plurality of apparatuses to perform the linking generates a transaction directed to an apparatus of an issuing party who has issued the contract.

* * * * *